US008262764B2

(12) United States Patent
Okabe

(10) Patent No.: US 8,262,764 B2
(45) Date of Patent: Sep. 11, 2012

(54) SHEET MEMBER, FORMING METHOD OF THE SAME, EXHAUST GAS TREATMENET APPARATUS, AND MUFFLING APPARATUS

(75) Inventor: Takahiko Okabe, Ogaki (JP)

(73) Assignee: Ibiden Co., Ltd., Ogaki-Shi (JP)

( * ) Notice: Subject to any disclaimer, the term of this patent is extended or adjusted under 35 U.S.C. 154(b) by 632 days.

(21) Appl. No.: 12/020,226

(22) Filed: Jan. 25, 2008

(65) Prior Publication Data
US 2008/0178566 A1 Jul. 31, 2008

(30) Foreign Application Priority Data

Jan. 26, 2007 (JP) ................................. 2007-016773
Dec. 27, 2007 (JP) ................................. 2007-337554

(51) Int. Cl.
B01D 24/00 (2006.01)
(52) U.S. Cl. ........ 55/523; 60/311; 422/177; 55/DIG. 30
(58) Field of Classification Search .................... 55/490, 55/491, 492, 522, 523, 524, 527; 428/3, 428/292.1, 293.4, 213, 332; 156/60, 306.3; 181/252; 60/311; 422/177
See application file for complete search history.

(56) References Cited

U.S. PATENT DOCUMENTS

| 4,285,909 A * | 8/1981 | Mizusawa et al. ............. 422/179 |
| 5,869,010 A * | 2/1999 | Langer ........................... 422/179 |
| 6,726,884 B1 * | 4/2004 | Dillon et al. ................... 422/179 |
| 2002/0168492 A1 | 11/2002 | Madono et al. |
| 2003/0026968 A1 * | 2/2003 | Kojima ....................... 428/292.1 |
| 2003/0068481 A1 * | 4/2003 | Kody et al. ................. 428/292.1 |
| 2003/0087077 A1 * | 5/2003 | Samuels et al. ............ 428/292.1 |
| 2003/0165670 A1 * | 9/2003 | Gerard et al. .............. 428/292.1 |
| 2004/0134172 A1 * | 7/2004 | Kumar et al. .................... 55/523 |
| 2005/0232828 A1 * | 10/2005 | Merry ........................... 422/179 |
| 2007/0184740 A1 | 8/2007 | Keller et al. |
| 2008/0181831 A1 | 7/2008 | Okabe |
| 2009/0049690 A1 | 2/2009 | Eguchi |
| 2009/0072498 A1 | 3/2009 | Tanahashi et al. |
| 2009/0075812 A1 | 3/2009 | Tanahashi et al. |
| 2009/0081442 A1 | 3/2009 | Tanahashi et al. |

(Continued)

FOREIGN PATENT DOCUMENTS

EP 1726698 11/2006

(Continued)

OTHER PUBLICATIONS

Japanese Office Action for corresponding JP Application No. 2007-337554, Jan. 4, 2012.

Primary Examiner — Duane Smith
Assistant Examiner — Thomas McKenzie
(74) Attorney, Agent, or Firm — Ditthavong Mori & Steiner, P.C.

(57) ABSTRACT

A sheet member including inorganic fibers includes a first outer layer; a center layer; and a second outer layer. The first outer layer, the center layer, and the second outer layer are laminated with each other such that both the first and the second outer layers are outermost layers; the center layer includes inorganic fibers having diameters equal to or less than approximately 3 micrometers; and the first and the second outer layers include inorganic fibers having diameters greater than approximately 3 micrometers.

22 Claims, 14 Drawing Sheets

U.S. PATENT DOCUMENTS

2009/0081455 A1 3/2009 Mitani

FOREIGN PATENT DOCUMENTS

| JP | 2003-225963 | 8/2003 |
| JP | 2003-266572 | 9/2003 |
| JP | 2005-120560 | 5/2005 |
| WO | WO 2005/035896 | 4/2005 |
| WO | WO 2005/105427 | 11/2005 |
| WO | WO 2006/065534 | 6/2006 |
| WO | WO 2007/080975 | 7/2007 |

* cited by examiner

SHEET MEMBER, FORMING METHOD OF THE SAME, EXHAUST GAS TREATMENET APPARATUS, AND MUFFLING APPARATUS

CROSS-REFERENCE TO RELATED APPLICATIONS

The present application claims priority under 35 U.S.C. §119 to Japanese Patent Application Nos. 2007-016773 filed Jan. 26, 2007 and 2007-337554 filed Dec. 27, 2007, the entire contents of which are incorporated herein by reference.

BACKGROUND OF THE INVENTION

1. Field of the Invention

The present invention relates to a sheet member, a forming method of the sheet member, and an exhaust gas treatment apparatus using such a sheet member as its holding and sealing member and/or its heat insulating member. Further, the present invention relates to a muffling apparatus having such a sheet member as a sound absorber.

2. Description of the Related Art

The number of vehicles has been dramatically increased from the beginning of this century, thereby steadily and rapidly increasing the amount of exhaust gas exhausted from the internal combustion engines of the vehicles. Particularly, various materials included in the exhaust gas exhausted from diesel engines are responsible for causing contamination, thereby seriously damaging the world-wide environment.

Under such circumstances, various exhaust gas treatment apparatuses have been conventionally proposed and put into practice. In a typical exhaust gas treatment apparatus, there is a casing made of, for example, metal in the middle of an exhaust gas tube connected to an exhaust gas manifold of an engine, and there is an exhaust gas treatment member in the casing. The exhaust gas treatment member has many cells each extending in the longitudinal direction and separated from each other by cell walls. As examples of the exhaust gas treatment member, there are an exhaust gas filter such as a catalyst carrier and a Diesel Particulate Filter (DPF). In such DPFs, one end surface of each cell is sealed to form a checkered pattern and the particulates in exhaust gas can be removed by being trapped on the cell walls before the exhaust gas is exhausted from the exhaust gas treatment member. The typical materials of the exhaust gas treatment member include ceramics in addition to metals and alloys. As a typical example of the exhaust gas treatment member, cordierite honeycomb filter is known. Recently, porous sintered silicon carbide has started to be used as a material of the exhaust gas treatment members from the viewpoint of its properties of thermal insulation, mechanical strength, and chemical stability.

Generally, a holding and sealing member is displaced between such an exhaust gas treatment member and a casing. The holding and sealing member is used to avoid the contact between the exhaust gas treatment member and the casing so as to avoid damage while the vehicle is being operated and also avoid leakage of untreated exhaust gas through the gaps between the casing and the exhaust gas treatment member. Further, the holding and sealing member has a role to avoid the displacement of the exhaust gas treatment member due to the pressure of the exhaust gas. Still further, the holding and sealing member is required to be kept at high temperature to sustain the reactivity, and to have thermal insulation efficiency. As a member meeting the above requirements, there is a sheet member made of inorganic fibers such as alumina-based fibers.

The sheet member is twisted around at least one part on the outer surface excepting an opening surface of the exhaust gas treatment member. For example, one end of the sheet member is engaged with the other end of the sheet member, and the sheet member is integrated with the exhaust treatment member by, for example, taping, so as to be used. After the processes, the integrated parts are housed inside the casing to form the exhaust gas treatment apparatus.

On the other hand, the inorganic fibers included in such a sheet member typically have various fiber diameters including extremely small diameters. Such fine fibers are apt to be scattered in all directions when being handled, so it is difficult to handle such fibers and, therefore, it is not good for the working environment and human health. For example, according to a report, inorganic fibers having a diameter of 3 micrometers or less are not good for human health. Because of the feature, inorganic fibers may be subject to control in some areas (For example, Germany Technical Guideline TRGS905). The contents of Germany Technical Guideline TRGS905 are incorporated herein by reference in their entirety.

To solve the problem, there is disclosed a sheet member that does not include inorganic fibers having a diameter of 3 micrometers or less (see Japanese Patent Application Publication No. 2005-120560).

The contents of Japanese Patent Application Publication No. 2005-120560 are incorporated herein by reference in their entirety.

SUMMARY OF THE INVENTION

According to an aspect of the present invention, there is provided a sheet member having inorganic fibers, including a first outer layer; a center layer; and a second outer layer. The first outer layer, the center layer, and the second outer layer are laminated with each other such that both the first and the second outer layers are outermost layers. The center layer includes inorganic fibers having diameters equal to or less than approximately 3 micrometers. The first and the second outer layers include inorganic fibers having diameters greater than approximately 3 micrometers.

In the sheet member according to an embodiment of the present invention, the scattering of inorganic fibers is controlled, the handling of the sheet member becomes easier, and the working environment is improved.

According to another aspect of the present invention, there is provided another sheet member including inorganic fibers. The sheet member includes first and second outer layers and a center layer. In the sheet member, the first outer layer, the center layer, and the second outer layer are laminated with each other such that both the first and the second outer layers are outermost layers. The center layer includes inorganic fibers having a diameter equal to or less than approximately 3 micrometers. The first and the second outer layers include inorganic fibers whose value "A", calculated by the following formula (1), of the inorganic fibers included in the first and the second outer layers is greater than approximately 6 micrometers:

$$A = (M - 2*e) \tag{1}$$

wherein, a reference symbol "M" represents an average diameter of the inorganic fibers included in the outer layers, and a reference symbol "e" represents a standard error given by the following formula $$e = (\sigma \div \sqrt{n}) \tag{2}$$

wherein, reference symbols "σ" and "n" represent the standard deviation and the number of measurements, respectively.

According to still another aspect of the present invention, there is provided still another sheet member including inorganic fibers. The sheet member includes first and second outer layers and a center layer. In the sheet member, the first outer layer, the center layer, and the second outer layer are laminated with each other such that both the first and the second outer layers are outermost layers. The center layer includes inorganic fibers having a diameter equal to or less than approximately 3 micrometers. One of the first outer layer and the second outer layer or both of the outlet layers include bio-soluble inorganic fibers.

In the sheet member, the average diameter and the minimum diameter of the inorganic fibers included in the first outer layer may be substantially equal to the average diameter and the minimum diameter, respectively, of the inorganic fibers included in the second outer layer.

Further, the first and the second outer layers are substantially the same.

Still further, preferably, a weight ratio (W) of the total weight of the first and the second outer layers with respect to the total weight of the entire sheet member is in a range greater than approximately 0 wt % and equal to or less than approximately 50 wt %.

Still further, preferably, a thickness ratio (t) of the total thickness of the first and the second outer layers with respect to the total thickness of the entire sheet member is in a range greater than approximately 0% and equal to or less than approximately 50%.

Still further, the sheet member may further include a covering layer covering at least a part of a side surface of the center layer. The covering layer does not cover the sides of the two outermost layers.

In this case, especially, the covering layer may be disposed so as to cover the entire side surfaces of the center layer.

Further, the covering layer may be substantially the same as the first outer layer or the second outer layer.

Still further, the sheet member may further include binder.

Still further, the sheet member may further include an adhesive layer disposed between the first or the second outer layer and the center layer.

According to still another aspect of the present invention, there is provided a method of forming a sheet member including inorganic fibers, the method. The method includes a step of forming a first outer layer including inorganic fibers having a minimum diameter greater than approximately 3 micrometers, a step of forming a center layer including inorganic fibers having a minimum diameter of equal to or less than approximately 3 micrometers, a step of forming a second outer layer including inorganic fibers having a minimum diameter greater than approximately 3 micrometers, and a step of laminating and joining the first outer layer, the center layer, and the second outer layer such that both the first and the second outer layers are outermost layers.

According to still another aspect of the present invention, there is provided another method of forming a sheet member including inorganic fibers. The method includes a step of forming a first outer layer including inorganic fibers whose value "A" calculated by in the following formula (1) is greater than approximately 6 micrometers, a step of forming a center layer including inorganic fibers having a minimum diameter equal to or less than approximately 3 micrometers, a step of forming a second outer layer including inorganic fibers whose value "A" calculated by the following formula (1) is greater than approximately 6 micrometers, and a step of laminating and joining the first outer layer, the center layer, and the second outer layer such that both the first and the second outer layers are outermost layers;

$$A=(M-2*e) \tag{1}$$

wherein, a reference symbol "M" represents an average diameter of the inorganic fibers included in the outer layers, and a reference symbol "e" represents a standard error given by the following formula $$e=(\sigma \div \sqrt{n}) \tag{2}$$

wherein, reference symbols "σ" and "n" represent the standard deviation and the number of measurements, respectively.

According to still another aspect of the present invention, there is provided still another method of forming a sheet member including inorganic fibers. The method includes a step of forming a first outer layer including first bio-soluble inorganic fibers, a step of forming a center layer including inorganic fibers having a minimum diameter equal to or less than approximately 3 micrometers, a step of forming a second outer layer including second bio-soluble inorganic fibers, and a step of laminating and joining the first outer layer, the center layer, and the second outer layer such that both the first and the second outer layers are outermost layers.

In the step of laminating and joining the layers, the formed layers may be joined to each other with an adhesive layer.

According to still another aspect of the present invention, there is provided a method of forming a sheet member including inorganic fibers. The method includes a step of feeding first raw slurry including inorganic fibers having a minimum diameter greater than approximately 3 micrometers into a forming device, a step of dehydrating the first slurry to form a first forming body, a step of feeding second raw slurry including inorganic fibers having a minimum diameter equal to or less than approximately 3 micrometers on the dehydrated first slurry, a step of dehydrating the second slurry to form a second forming body on the first forming body, a step of feeding third raw slurry including inorganic fibers having a minimum diameter greater than approximately 3 micrometers into the forming device, a step of dehydrating the third slurry to form a third forming body on the first and the second forming bodies, and a step of compressing and dehydrating a forming body having a three-layer structure where the third forming body is formed on the first and the second forming bodies to form a sheet member having a three-layer structure.

The method of forming a sheet member described above may further including a step of impregnating the sheet member with binder.

According to still another aspect of the present invention, there is provided an exhaust gas treatment apparatus including an exhaust gas treatment member and a holding and sealing member twisted around at least one part on the outer circumference surface of the exhaust gas treatment member. In the exhaust gas treatment apparatus, the holding and sealing member includes any one of the sheet members described above.

According to still another aspect of the present invention, there is provided an exhaust gas treatment apparatus including an inlet tube and an outlet tube for exhaust gas, an exhaust gas treatment member disposed between the inlet tube and the outlet tube, and a heat insulating member disposed at least on a part of the inlet tube and including any one of sheet members described above.

In the exhaust gas treatment apparatus, the exhaust gas treatment member may be a catalyst carrier or an exhaust gas filter.

According to still another aspect of the present invention, there is provided a muffling apparatus including an inner pipe, an outer shell covering the outer circumference of the inner pipe, and a sound absorber including to any one of the sheet members described above. In the muffling apparatus, the sound absorber is between the inner pipe and the outer shell so that the first outer layer of the sheet member faces the outer shell.

In the sheet member according to an embodiment of the present invention, the scattering of inorganic fibers is controlled, the handling of the sheet member becomes easier, and the working environment of handling the sheet member is improved. Further, when the sheet member is used as a holding and sealing member in an exhaust gas treatment apparatus, it is possible to reduce the decrease of the holding power with respect to the exhaust gas treatment apparatus. Further, when such a sheet member is used as a sound absorber of a muffling apparatus, it is possible to control the reduction of the surface pressure between the inner pipe and the outer shell.

Therefore, according to an embodiment of the present invention, there are provided an exhaust gas treatment apparatus using the sheet member as a holding and sealing member and/or heat insulating member, a forming method of the exhaust gas treatment apparatus, and a muffling apparatus using the sheet member as a sound absorber.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
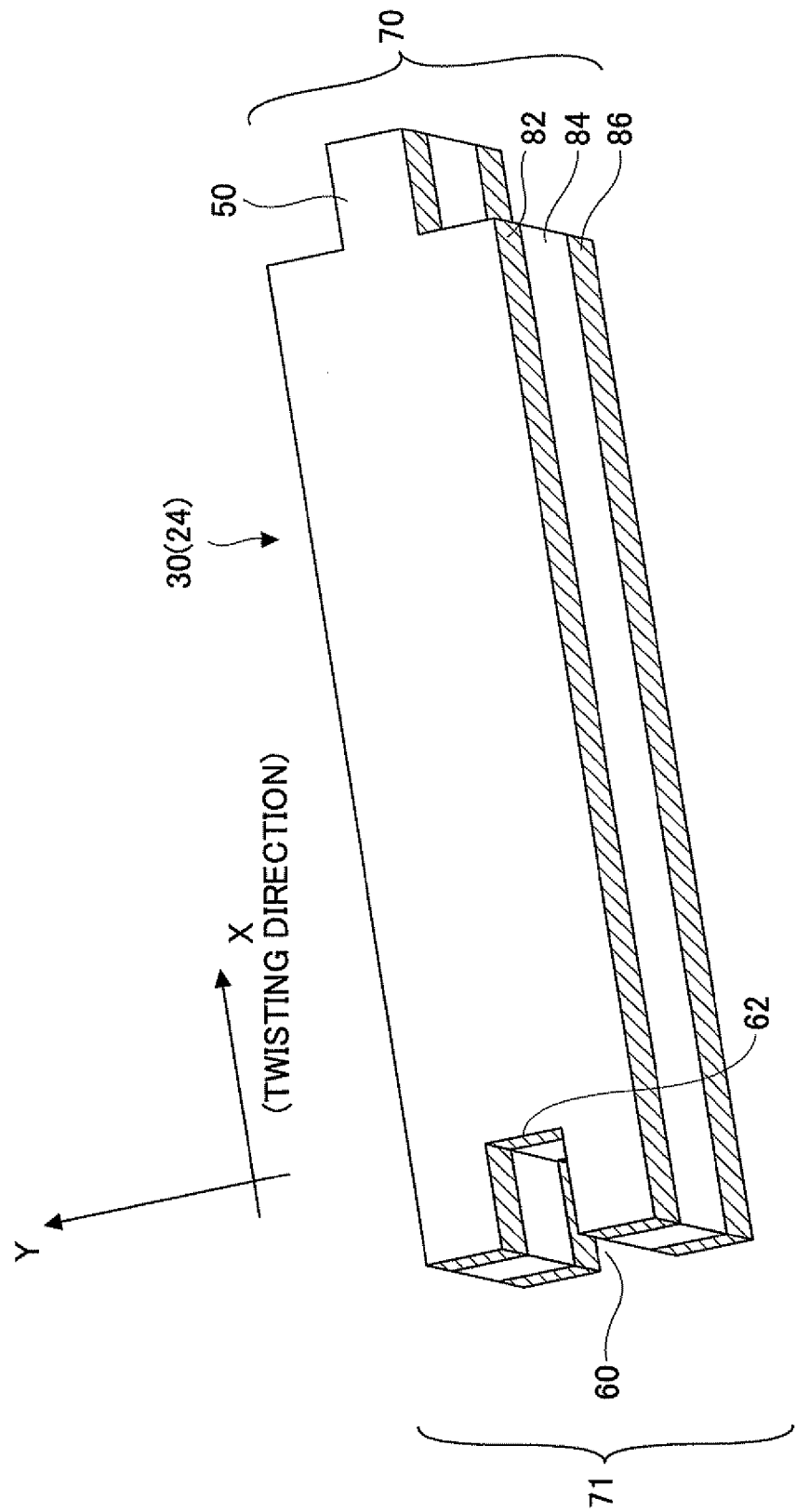
FIG. 1 is a drawing showing an exemplary figure of a sheet member according to an embodiment of the present invention.

The embodiments will now be described with reference to the accompanying drawings, wherein like reference numerals designate corresponding or identical elements throughout the various drawings.

(First Embodiment)

Figure 2:
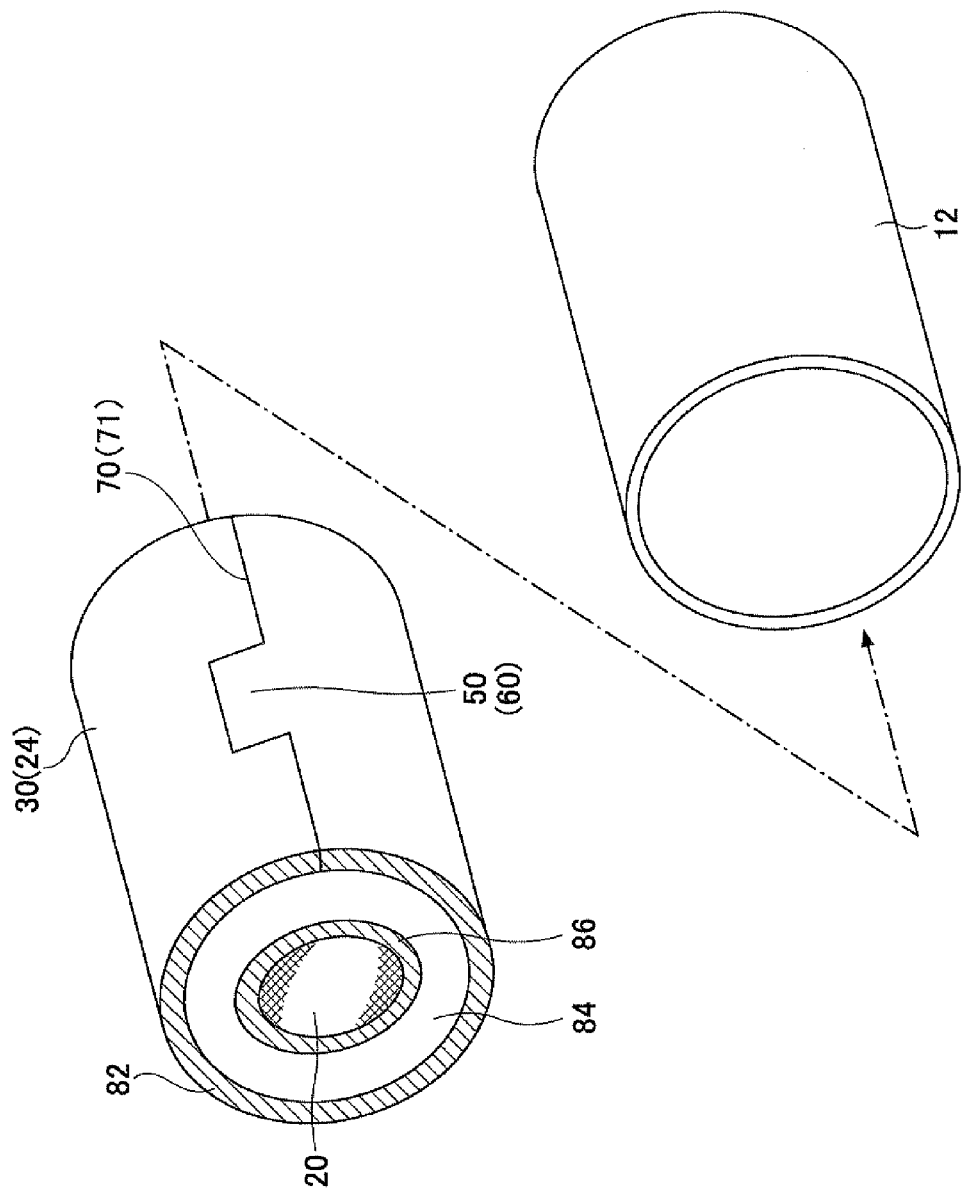
FIG. 2 is a schematic diagram showing where a sheet member according to an embodiment of the present invention is integrated with an exhaust gas treatment member into a casing.

FIG. 1 shows an exemplary figure of a sheet member (a first sheet member) according to a first embodiment of the present invention. However, it should be noted that the figure of the sheet member according to an embodiment of the present invention is not limited to the figure of the sheet member shown in FIG. 1. FIG. 2 is an exploded perspective view of an exhaust gas treatment apparatus using the sheet member according to one embodiment of the present invention as a holding and sealing member of the exhaust gas treatment apparatus.

When a sheet member 30 according to an embodiment of the present invention is twisted around an exhaust gas treatment member 20 such as a catalyst carrier to be used as a holding and sealing member 24 of an exhaust gas treatment apparatus, as shown in FIG. 1, an engagement convex part 50 and an engagement concave part 60 are provided on end faces 70 and 71, respectively, perpendicular to the twisting direction (X direction) of the sheet member 30. When the sheet member 30 is twisted around the exhaust gas treatment member 20, as shown in FIG. 2, the engagement convex part 50 and the engagement concave part 60 engage each other so as to fix the sheet member 30 in place around the exhaust gas treatment member 20. Then, the exhaust gas treatment member 20 with the sheet member 30 twisted around is pressed into a cylinder-shaped casing made of, for example, metal by, for example, a press-fit method to produce an exhaust gas treatment apparatus 10.

The sheet member 30 according to an embodiment of the present invention is made of mainly inorganic fibers, but may further include binder as described below.

A sheet member 30 according to an embodiment of the present invention includes at least three layers: a first outer layer 82, a center layer 84, and a second outer layer 86. The first outer layer 82, the center layer 84, and the second outer layer 86 are laminated to each other such that the first outer layer 82 and the second outer layer 86 are the outermost surfaces. For example, in FIG. 1, the sheet member 30 is configured such that the first outer layer 82, the center layer 84, and the second outer layer 86 are laminated in this order.

The center layer 84 is a sheet including inorganic fibers having diameters of approximately 3 micrometers or less (hereinafter referred to as "fine fibers"), or is, for example, a sheet member including inorganic fibers conventionally used as a holding and sealing member of an exhaust gas treatment apparatus. In contrast, the first outer layer 82 and the second outer layer 86 include the inorganic fibers except the "fine fibers".

When such a sheet member having a three-layer structure is being handled, the "fine fibers" included in the center layer 84 are unable to move freely due to the first and the second outer layers 82 and 86, respectively provided on upper- and lowermost surfaces of the sheet member. Because of this structure, the scattering of the "fine fibers" from the sheet member is reduced, thereby improving the handling of the sheet member and the working environment while the sheet member is being handled. Accordingly, the embodiment of the present invention may provide a sheet member with ease of operation.

Generally, when a sheet member including fibers having only larger diameters is used as a holding and sealing member in an exhaust gas treatment apparatus, many fibers included in the sheet member may be broken and damaged, thereby disadvantageously reducing the repulsive power against an external compression stress and the holding power to hold the exhaust gas treatment member while the sheet member is being handled (that is, being twisted around an exhaust gas treatment member or put into a casing) or the exhaust gas treatment apparatus is being used. However, a sheet member according to an embodiment of the present invention includes the "fine fibers" capable of improving the holding power. Thus, when the sheet member is used as a holding and sealing member in an exhaust gas treatment apparatus, unlike the case where a sheet member that does not include the "fine fibers" is used, the reduction of the holding power to hold the exhaust gas treatment member can be attenuated, and an appropriate holding power to hold the exhaust gas treatment member can be thus maintained.

According to an embodiment of the present invention, the upper limit of a weight ratio "W" of the total weight of the first and the second outer layers with respect to the total weight of the entire sheet member is not limited to, but preferably equal to or less than approximately 50 wt %, and more preferably equal to or less than approximately 20 wt %. On the other hand, the lower limit of "W" should be any value more than zero, theoretically. However, as long as the "W" is not extremely small, fine fibers included in the center layer 84 may not be scattered outside through the first outer layer 82 and/or the second outer layer 86. Therefore, from a practical point of view, the lower limit of "W" is preferably equal to or more than approximately 2 wt %. Further, it should be noted that the weight of the first layer may be substantially the same as or may be different from the weight of the second layer. For example, the weight ratio of the first outer layer 82 to the second outer layer 86 may be in the range between approximately 1:9 and approximately 9:1.

Further, a thickness ratio "t" of the total thicknesses of the first and the second outer layers with respect to the total thickness of the entire sheet member is, for example, but not limited to, approximately 0<t≦ approximately 70%, preferably approximately 0<t≦ approximately 50%, and more preferably approximately 0<t≦ approximately 20%. Still further, the total thickness of the entire sheet member when the sheet member is placed on a horizontal surface in a stationary status is, for example, in a range between approximately 5 mm and approximately 20 mm. Further, it should be noted that the thickness of the first layer may be substantially the same as or may be different from the thickness of the second layer. For example, the height ratio of the first outer layer 82 to the second outer layer 86 may be in the range between approximately 1:9 and approximately 9:1.

However, when the thickness ratio "t" becomes extremely small, some fine fibers included in the center layer 84 may be scattered outside through the first outer layer 82 and/or the second outer layer 86. Therefore, from a practical point of view, the lower limit of "W" is preferably equal to or more than approximately 1%.

Further, the first and the second outer layers having a basis weight of, for example, but not limited to, from approximately 60 g/m$^2$ to approximately 1,500 g/m$^2$ are typically used. The center layer having the basis weight of, for example, but not limited to, from approximately 500 g/m$^2$ to approximately 3,000 g/m$^2$ is typically used. Here, the basis weight refers to the total weight of the fibers included in a unit area of the sheet member. However, when binder is included in the sheet member, the basis weight refers to the total weight of the binder and the fibers included in a unit area. Also, each layer having a bulk density of, for example, but not limited to, from approximately 0.07 g/cm$^3$ to approximately 0.30 g/cm$^3$ are typically used.

According to the embodiment of the present invention, in general, a sheet member having a bulk density of, for example, but not limited to, from approximately 0.07 g/cm$^3$ to approximately 0.30 g/cm$^3$ and having a basis weight of, for example, but not limited to, from approximately 500 g/m$^2$ to approximately 3,000 g/m$^2$, respectively, is typically used.

It should be noted that, in the first embodiment, as for the inorganic fibers used for the first and the second outer layers, the inorganic fibers having an average diameter of, for example, but not limited to, in the range between approximately 5 micrometers and approximately 10 micrometers can be used. However, it should be arranged that that "fine fibers" are not included in the both outer layers. Because of this feature, in most cases, the minimum diameter of the inorganic fibers included in the first and the second outer layers is in the range between approximately 3.1 micrometers and approximately 5.0 micrometers. Further, in the present invention, the specifications (average fiber diameter, minimum fiber diameter, and forming method) of the first and the second outer layers may be substantially the same or may be different from each other.

On the other hand, the average diameter of the inorganic fibers included in the center layer is in the range between approximately 3.0 micrometers and approximately 8.0 micrometers. But the "fine fibers" may also be included in the center layer.

The average diameter of inorganic fibers included in each layer is measured by the following method. First, a sample of alumina-based fibers obtained from each layer is entered into a cylinder and then is crushed under a pressure of approximately 20.6 MPa. Next, the sample is put on a sieving screen to be sieved. The sample that has passed through the sieving screen is transferred to be a specimen of an electron microscope. After a material such as gold is evaporated onto the surface of the specimen, electron microscope pictures with approximately 1500 times magnification of the specimen are taken. Diameters of at least 40 fibers from the taken pictures are measured. This procedure is repeated for five separate specimens to obtain the average diameter of the inorganic fibers in the layer by averaging the measured values.

Also, the minimum diameter of the fibers included in each layer is obtained by the following method. The electron microscope pictures (approximately 1,500 times magnitude) in appropriate portions of each of the outer layers and center layer are taken. From the taken pictures (of approximately 50 fibers), the fiber having the minimum diameter is selected, and the diameter of the fiber is measured. The same operation but in different portions of each layer is repeated to take additional six pictures. The minimum diameter from among the obtained diameters is selected as the minimum fiber diameter of the layer.

Further, when a sheet member is formed by the "needling processing method" described below, the density of needle traces in each layer is preferably in the range between approximately 2.0 pieces/cm$^2$ and approximately 20.0 pieces/cm$^2$. This is because when the density of needle traces is more than approximately 2.0 pieces/cm$^2$ the strength of the sheet member is not reduced. On the other hand, when the density of needle traces is changed in the range less than approximately 20.0 pieces/cm$^2$, the bulk density is changed and the sheet member is hardened and the handling won't be more difficult.

In the present application, "needle traces" refer to the fiber confounding traces having a maximum size equal to or less than approximately 3 mm$^2$ generated on the sheet member when fiber confounding units such as needles are thrust into and pulled out of the sheet member formed by the "needling processing method".

As described above, the sheet member 30 according to the embodiment of the present invention is twisted around the outer surface of the exhaust gas treatment member 20 and is used after the ends of the sheet member 30 are engaged with each other and fixed in place with a tape. The exhaust gas treatment member 20 covered by the sheet member 30 is then pressed into the casing 12 to form an exhaust gas treatment apparatus 10.

(Second Embodiment)

Next, a configuration of another sheet member (a second sheet member) according to an embodiment of the present invention is described.

Like a sheet member 30 shown in FIG. 1, the second sheet member includes the first outer layer, the center layer, and the second outer layer, those layers laminated in this order. However, in the second sheet, a value "A", calculated by the following formula (1), of the inorganic fibers included in the first and the second outer layers is greater than approximately 6 micrometers.

$$A=(M-2*e) \quad (1)$$

Where, a reference symbol "M" represents an average diameter of the inorganic fibers included in the outer layers. A reference symbol "e" represents a standard error given by the following formula $$e=(\sigma \div \sqrt{n}) \quad (2)$$

Where, reference symbols "σ" and "n" represent the standard deviation and the number of measurements, respectively.

According to EU directive 97/69/EC, effective on 5 Dec. 1997, the regulations for the health and safety aspects of glass fibers in Europe (hereinafter referred to as "EU directive"), the inorganic fibers whose value "A" in the formula (1) exceeds approximately 6 micrometers are classified as so-called "Note-R" and are not subject to control.

Therefore, in the sheet member having the above-mentioned first and the second outer layers (the second sheet member), even when the inorganic fibers are scattered from the first and the second outer layers, the inorganic fibers are unlikely to harm the human body. Further, as described above, since the first and the second outer layers are provided on both surface sides of the sheet member, the scattering of the "fine fibers" from the center layer is significantly controlled when being handled. As a result, in such a sheet member, as described above, the handling of the sheet member becomes easier and the working environment is improved.

Further, since the sheet member includes the "fine fibers" contributing the improvement of the holding power, it is possible to minimize the reduction of the holding power as much as possible.

It should be noted that only when the relationship A>approximately 6 micrometers is satisfied, the average diameters of the first and the second outer layer are not limited. As a result, unlike the first embodiment, it should be noted that both the first and the second outer layers may include some amount of "fine fibers". On the other hand, in the center layer, similar to the first embodiment, the "fine fibers" are included and the average diameter of the inorganic fibers is preferably in the range between approximately 3.0 micrometers and approximately 8.0 micrometers.

(Third Embodiment)

In the sheet member according to the first and the second embodiments of the present invention, the minimum diameter of the inorganic fibers in the first and the second outer layers exceeds approximately 3.0 micrometers and the inorganic fibers whose value "A" in the formula (1) exceeds approximately 6 micrometers are included in the first and the second outer layers. On the other hand, in a sheet member according to the third embodiment of the present invention (a third sheet member), "bio-soluble inorganic fibers" are included in the first outer layer and/or the second outer layer.

The "bio-soluble inorganic fibers" generically refers to the inorganic fibers that satisfy so-called "Note-Q" requirements and that are not subject to control as inorganic fibers based on the "EU directive". It should be noted that according to the "Note-Q" standards of the "EU directive", the inorganic fibers fulfilling one of the following conditions is not classified as a control subject:

A) A short-term biopersistence test by inhalation has shown that the inorganic fibers longer than 20 micrometers have a weighted half life less than 10 days;

B) A short-term biopersistence test by intratracheal instillation has shown that the inorganic fibers longer than 20 micrometers have a weighted half life less than 40 days;

C) An appropriate intra-peritoneal test has shown no evidence of excess carcinogenicity; or D) Absence of relevant pathogenicity or neoplastic changes in a suitable long term inhalation test.

Even when such "bio-soluble inorganic fibers" are taken into a human body, since the "bio-soluble inorganic fibers" are dissolved in the human body and have little impact on the human body, the "bio-soluble inorganic fibers" are safe. Therefore, when the "bio-soluble inorganic fibers" are included in the first or the second outer layer of the sheet member, the inorganic fibers scattered from the layer have little impact on the human body. Further, the scattering of the "fine fibers" included in the center layer in the middle of the sheet member is controlled. As a result, when the third sheet member is used, it is possible that the handling of the sheet member becomes easier and the working environment is significantly improved.

(Fourth Embodiment)

In the aforementioned three embodiments, the first and the second outer sheets 82 and 86 are disposed one on each of the "main surfaces" of the center layer 84 to configure the sheet member of the embodiment of the present invention. However, the sheet member according to an embodiment of the present invention is not limited to such configuration.

Figure 3:
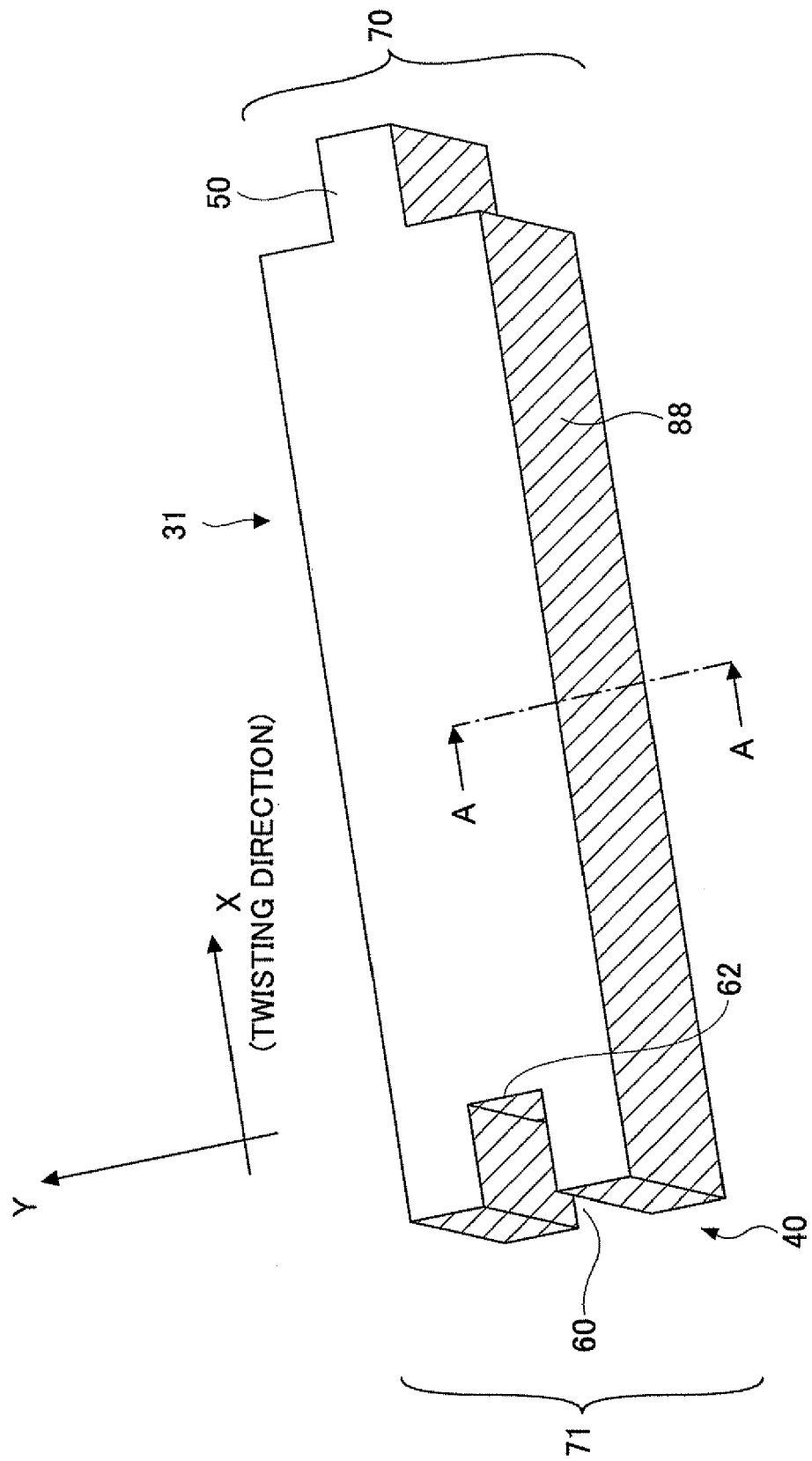
FIG. 3 is a drawing showing another sheet member according to another embodiment of the present invention.
Figure 4:
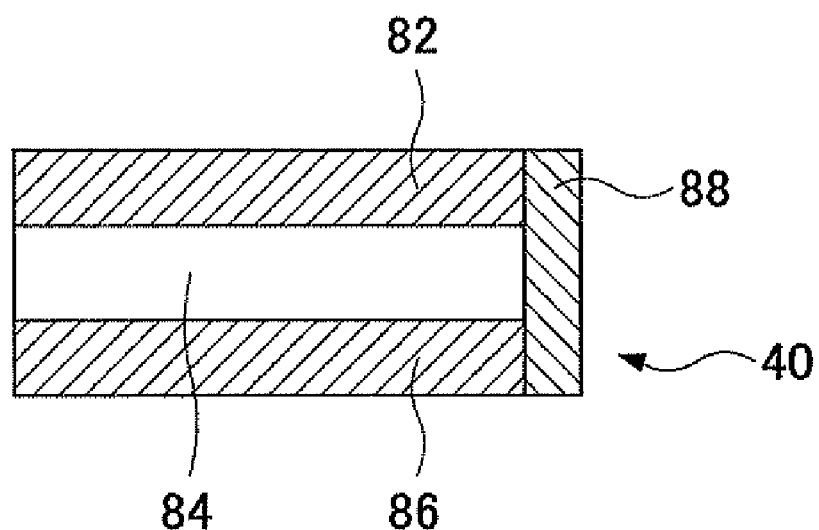
FIG. 4 is a cut-open view taken along the line A-A in FIG. 3.

FIGS. 3 and 4 show another exemplary configuration of a sheet member according to an embodiment of the present invention (a fourth sheet member). FIG. 4 is a cut-open view taken along the line A-A in FIG. 3. Similar to the sheet member 30 in FIG. 1, the sheet member 31 includes the first outer layer 82, the center layer 84, and the second outer layer 86, those layers being laminated in this order. However the fourth sheet member 31 is different from the sheet member 30 in FIG. 1 in that the sheet member 31 further includes a covering layer 88 provided so as to cover the entire side surface 40 of the sheet member 31.

In the sheet member 31 including the covering layer 88, the center layer 84 is not exposed on the side surface 40 of the sheet member 31. Because of this structure, when, for example, the sheet member 31 is being handled, it is possible to control the scattering of the "fine fibers" outside from the sheet member 31. Therefore, it is possible to further control the scattering of the "fine fibers" outside from the sheet member 31.

In FIG. 3, the covering layer 88 is provided so as to cover the entire side surface 40 of the sheet member 31. However, it should be noted that the covering layer 88 may be disposed so as to cover only a part of the side surface 40. In this case, the effect to control the scattering of the "fine fibers" is reduced compared with the sheet member 31 in FIG. 3. Nevertheless, the scattering of the "fine fibers" can be significantly controlled compared with the sheet member 30 in FIG. 1.

The covering layer 88 is disposed on the side surface 40 of the sheet member 31, for example, with an adhesive agent or by stitching. The covering layer 88 may be any layer as long as the layer can control the scattering of the "fine fibers" and may be made of substantially the same material as the first outer layer or the second outer layer.

Further, in FIG. 3, the first and the second outer layers include inorganic fibers without the "fine fibers" similar to the first sheet member. However, it is obvious that the inorganic fibers whose value "A" in formula (1) exceeds approximately 6 micrometers or the "bio-soluble inorganic fibers" may be included in the first and the second outer layers like the second and the third sheet members.

Figure 5:
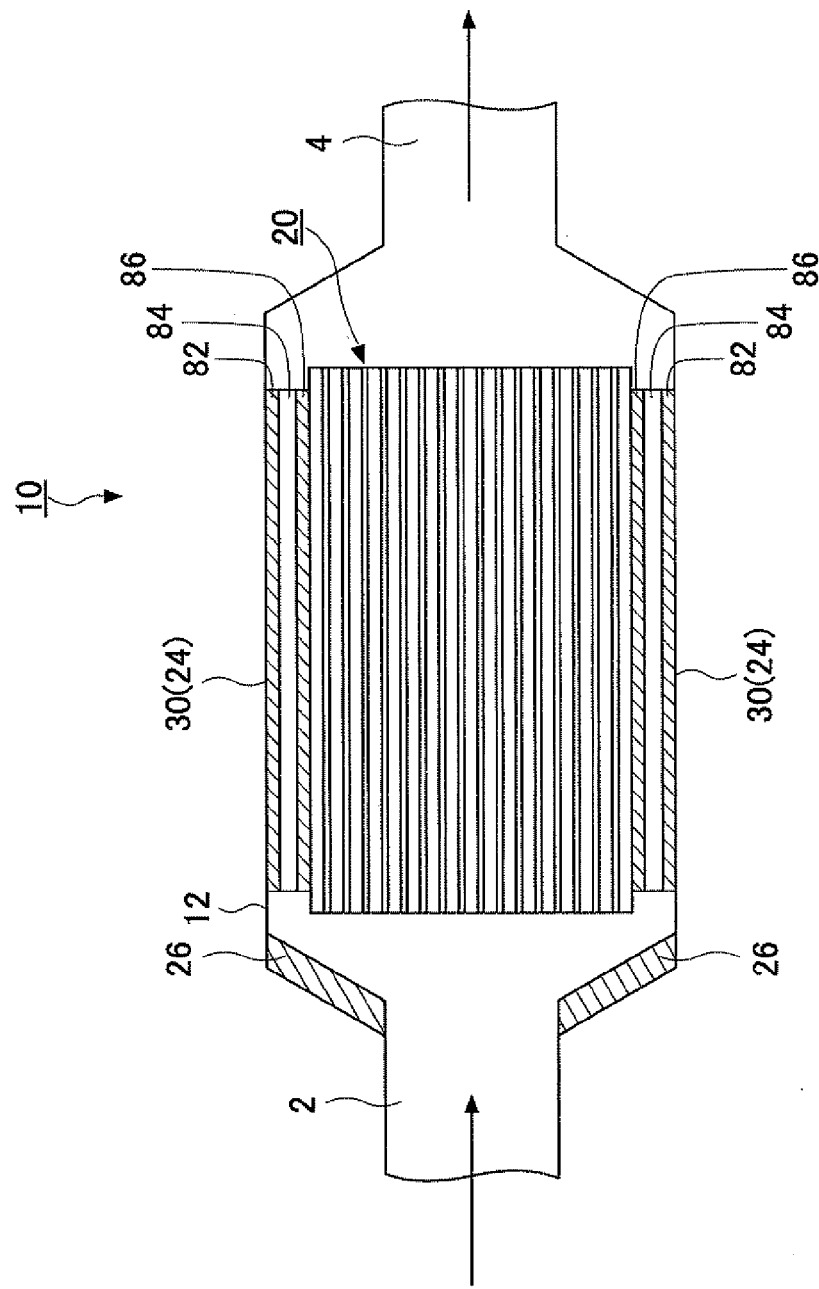
FIG. 5 is a drawing schematically showing an exemplary configuration of an exhaust gas treatment apparatus according to one embodiment of the present invention.

FIG. 5 shows an exemplary configuration of an exhaust gas treatment apparatus 10 according to an embodiment of the present invention. The exhaust gas treatment apparatus 10 includes an exhaust gas treatment member 20 with a holding and sealing member 24 twisted around the outer surface of the exhaust gas treatment member 20, a casing 12 housing the exhaust gas treatment member 20, and an inlet tube 2 and an outlet tube 4 for exhaust gas. In the example of FIG. 5, the sheet member 30 in FIG. 1 (or any one of the first through the third sheet members) is used as the holding and sealing member 24. However, the sheet member 31 in FIG. 3 (the fourth sheet member) may also be used as the holding and sealing member 24. The inlet tube 2 and the outlet tube 4 have taper shapes near the casing so as to fit the casing 12. However, such a taper shape is not always necessary. A heat insulating member 26 is provided on a part of the inlet tube 2 (taper section in the example of FIG. 5), thereby preventing the heat inside the exhaust gas treatment apparatus 10 from transferring outside through the inlet tube 2.

In this example of FIG. 5, the exhaust gas treatment member 20 is a catalyst carrier having openings for the inlet and the outlet of exhaust gas and plural cells (or through holes) disposed in the direction substantially parallel to the flow of exhaust gas. The catalyst carrier is made of, for example, porous silicon carbide having a honeycomb structure. It should be noted that the configuration of the exhaust gas treatment apparatus 10 according to an embodiment of the present invention is not limited to this configuration. For example, the exhaust gas treatment member 20 may be a DPF in which one of the end surfaces of each of the through holes is sealed to form checkered patterns at both ends.

In such an exhaust gas treatment apparatus, due to the effect of the sheet member described above, the scattering of the inorganic fibers when the sheet member is twisted around the exhaust gas treatment member is significantly controlled. Further, the holding and the sealing member can provide appropriate holding power to hold the exhaust gas treatment member.

In addition to the above, or besides the above, it is obvious to a person having ordinary skill in this art that the heat insulating member 26 may be configured with the sheet member according to an embodiment of the present invention.

Figure 6:
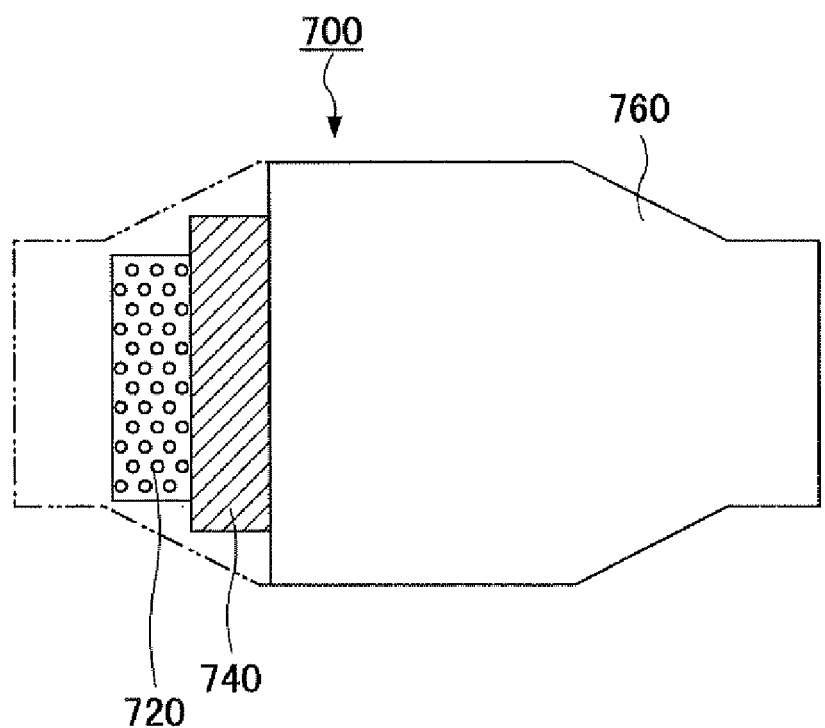
FIG. 6 is a drawing schematically showing an exemplary configuration of a muffling apparatus according to one embodiment of the present invention.

Next, another application of the sheet member according to an embodiment of the present invention is described. FIG. 6 schematically shows an exemplary muffling apparatus having a sheet member according to an embodiment of the present invention. This muffling apparatus is disposed in the middle of an exhaust tube for, for example, a two-wheel vehicle or a four-wheel vehicle. The muffling apparatus 700 includes an inner pipe 720 (made oft, for example, a metal such as stainless steel), an outer shell 760 covering the outer circumference of the inner pipe 720 (made of, for example, a metal such as stainless steel), and a sound absorber 740 disposed between the inner pipe 720 and the outer shell 760. Typically, plural small holes are formed on surface of the inner pipe 720. In such a muffling apparatus 700, when exhaust gas is passed through the inner pipe 720, noise of the exhaust gas is attenuated by the sound absorber 740.

Here, the sheet member according to an embodiment of the present invention can be used as the sound absorber 740. By using any one of the first through the fourth sheet members as the sound absorber 740, due to the effect described above, it is possible to significantly control the scattering of the inorganic fibers when the sheet member is twisted around the inner pipe 720. Further, it is possible to control the reduction of the surface pressure between the inner pipe and the outer shell.

Next, a method of forming a sheet member is described. In the following, the forming method of the sheet member 30 according to the first embodiment of the present invention is described.

Typically, there are two methods of forming such a sheet member 30 according to an embodiment of the present invention: a "laminating method" and an "all-in-one forming method".

Figure 7:
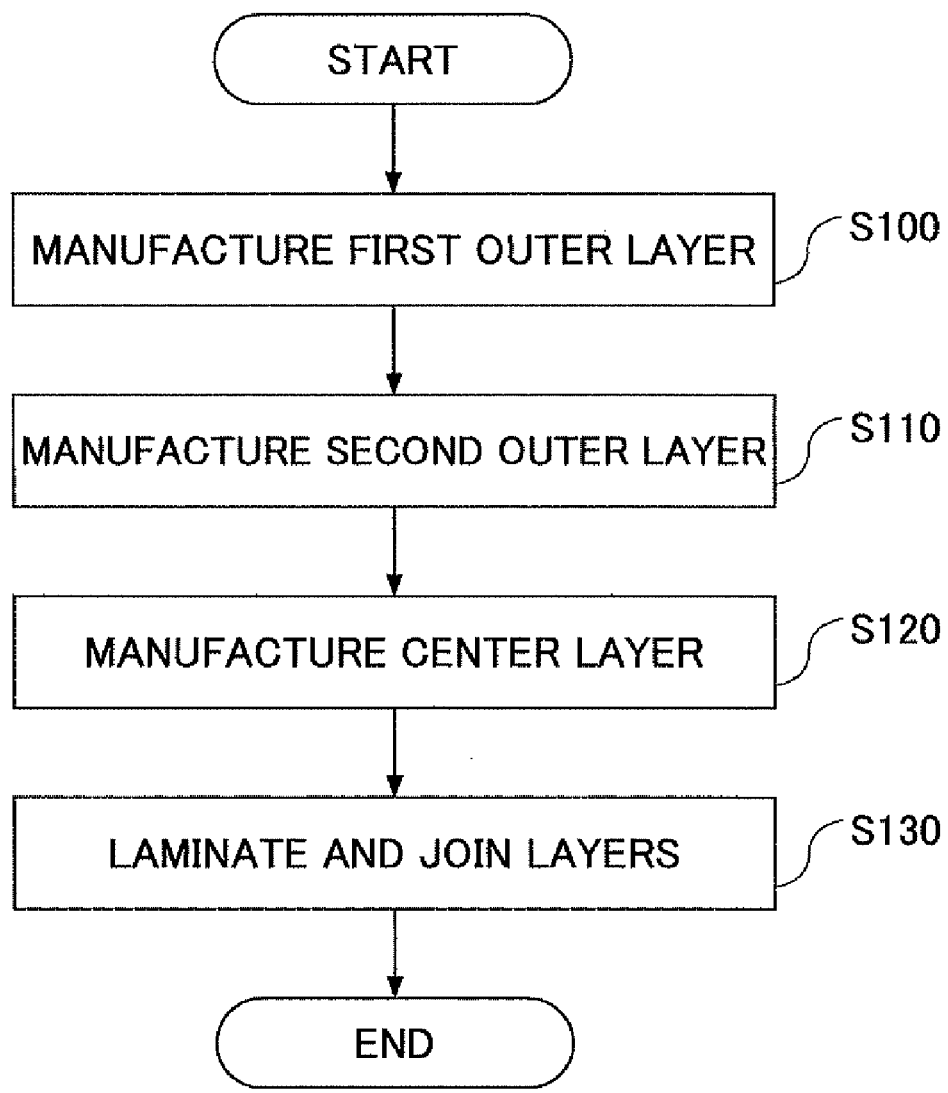
FIG. 7 is a flowchart showing a process of forming a sheet member based on a "laminating method" according to one embodiment of the present invention.

FIG. 7 is a flowchart showing a process of the "laminating method" to form a sheet member 30 according to an embodiment of the present invention. In this method, two layers including no "fine fibers" (that is, the first outer layer 82 and the second outer layer 86) and the center layer 84 including the "fine fibers" are formed separately, and then those layers are laminated and joined to form the sheet member having a three-layer structure.

First, in step S100, the first outer layer including no "fine fibers" is formed. The first outer layer is formed by, for example, the "needling processing method" or a "papermaking method" as described below. In the present application, it should be noted that the term "needling processing method" includes any method of forming a sheet member including a needling process in which fiber confounding units such as needles are thrust into and pulled out of the sheet member. Further, in the present application, it should be noted that the term "papermaking method" refers to a method of forming a sheet member including each step of opening, slurring, forming, compressing, and drying fibers.

Next, in step S110, the second outer layer including no "fine fibers" is formed. The same as the first outer layer, the second outer layer is formed by, for example, the "needling processing method" or the "papermaking method".

Next, in step S120, the center layer including the "fine fibers" is formed. The same as the first and the second outer layers, the center layer is also formed by, for example, the "needling processing method" or the "papermaking method". It should be noted that the forming methods (for example, the "needling processing method" and the "papermaking method") of those three layers may be the same or may be different from each other. Also the order of the forming steps is not always necessarily the same as the order of steps S100 through S120; for example, the center layer may be formed before the first and the second outer layers are formed.

Next, in step S130, these three layers are laminated in the order of the first outer layer, the center layer, and the second outer layer, and adjacent layers are adhered to each other. As a method of adhering layers to each other, there are some methods such as using an "adhesive layer", made of, for example, a double-sided adhesive tape and adhesive agent, provided at the boundary surface between the first/second outer layer and the center layer to adhere the layers to each other through the generated "adhesive layer" or sewing adjoining layers through the boundary surface. As the former method using the "adhesive layer", besides the method adhering the adjoining layers to each other through the "adhesive layer", there is another method in which thermally reversible films (such as a PE film and Warifu (Registered Trademark)) are thermally adhered to both sides of the center layer and the facing sides of the outer layers at a temperature of approximately 140° C. and, for example, a double-sided adhesive tape or adhesive agent is applied to one of the facing films so as to adhere those three layers to each other. As the adhesive agent, acrylic-based adhesive agent, acrylate-based Latex or the like may be used. The thickness of the double-sided adhesive tape, the adhesive agent, and the thermally reversible film is, for example, but not limited to, in the range between approximately 0.02 mm and approximately 0.60 mm.

In the present application, the "adhesive layer" refers to a layer provided at the boundary surface so as to join the center layer and two outer layers, including the above-mentioned thermally reversible film when it is used. Therefore, when the thermally reversible film is used, the thickness of one "adhesive layer" is determined by the quotation of (Thickness of thermally reversible film)*2+(Thickness of both-sided adhesive tape (or adhesive agent)). Thickness of the "adhesive layer" is, for example, in the range between approximately 0.02 mm and approximately 0.60 mm.

In the "laminating method", a sheet member according to an embodiment of the present invention is formed through the steps described above.

In a typical "all-in-one forming method", unlike the above-mentioned "laminating method", a sheet member having a three-layer structure is formed through a sequence of processing steps. In the "all-in-one forming method", a sheet member is also formed by either the "needling processing method" or the "papermaking method". However, in the "all-in-one forming method", since it is not necessary to prepare each layer independently and a single forming machine can be used, it is advantageous that the forming process can be simplified.

In the following, examples of forming a sheet member according to the embodiments of the present invention are described in detail based on the "laminating method" and the "all-in-one forming method". In the following, a sheet member including a mixture of alumina and silica as inorganic fibers is described as examples. It should be noted that the inorganic fibers are not limited to this mixture but may include only either alumina or silica. Any other type of inorganic fibers may be used.

(Laminating Method 1)

As described above, in this laminating method, it is necessary to prepare each layer separately. Each layer is formed by the "needling processing method" through each process of preparing spinning solution, blowing, needling, calcining, and impregnating binder.

(Preparing Process of Spinning Solution)

Silica sol is added to basic aluminum chloride aqueous solution with aluminum content 70 g/l and Al/Cl=approximately 1.8 (atom ratio) such that the composing ratio of alumina and silica is approximately 60-97: approximately 40-3 to prepare the precursor of inorganic fibers. More preferably, the composing ratio of alumina and silica is approximately 70-97: approximately 30-3. This is because, when the composing ratio of alumina is equal to or less than approximately 60%, the composing ratio of mullite prepared from alumina and silica is lowered, and the heat conductivity of each formed layer is increased. As a result, the thermal insulating properties of each layer is apt to be reduced. On the other hand, when the composing ratio of alumina exceeds approximately 97%, the flexibility of the inorganic fibers is lowered.

Next, organic polymer such as polyvinyl alcohol is added to the precursor of the alumina-based fibers. Then the liquid is condensed to prepare a spinning solution.

(Blowing Process)

Next, fibers are formed by a blowing process using the obtained spinning solution. The blowing process refers to a method of forming fibers using a carrier flow blown through a carrier nozzle and a spinning solution flow pushed out through a spinning solution supply nozzle. In this process, the average diameter and the minimum diameters of alumina fiber precursor is controlled by adjusting the flow rate of the carrier gas (air) and the supplying rate of the spinning solution. Therefore, in this process, the average diameter and the minimum diameters of the inorganic fibers included in the formed outer layers and center layer is determined.

Typically, the diameter of the spinning solution supply nozzle is in the range between approximately 0.1 mm and approximately 0.5 mm. When the outer layers are formed, the typical air flow rate of the flow through the carrier nozzle is in the range between approximately 30 m/s and approximately 150 m/s, and the typical supplying rate of the spinning solution through the spinning solution supply nozzle is in the range between approximately 1 ml/h and approximately 120 ml/h. On the other hand, when the center layer is formed, the typical air flow rate of the flow through the carrier nozzle is in the range between approximately 40 m/s and approximately 200 m/s, and typical supplying rate of the spinning solution through the spinning solution supply nozzle is in the range between approximately 1 ml/h and approximately 60 ml/h.

Next, a raw sheet is formed by laminating the precursors in which the fibers have been formed.

(Needling Process)

Next, a needling process is performed on the raw sheet. In the needling process, a needling device is typically used.

Generally, the needling device includes a needle board reciprocally movable in the thrusting direction (typically in the up-and-down direction) and a pair of supporting boards provided on both sides facing the front face and the rear face of the raw sheet. On the needle board, there are plenty of needles arranged in a density of, for example, 5 to 5,000 needles per 100 $cm^2$ to thrust into the raw sheet. In each supporting board, there are plenty of through holes. Therefore, while the raw sheet is held down from both sides by a pair of the supporting boards, by bringing the needle board close to the raw sheet and separating the needle board away from the raw sheet, the needles are thrust into and pulled out of the raw sheet to form a raw sheet in which fibers are confounded. In this process, the needling device may include a conveying unit conveying the raw sheet at a constant speed (for example, approximately 20 mm/s) in the predetermined direction (for example, substantially parallel to the front and rear surfaces of the raw sheet). In this case, since it is possible to perform the needling process while the raw sheet is being moved with a constant speed, it is no longer necessary to move the raw sheet manually every time after the needle board presses and contacts the raw sheet.

As another configuration, the needling device may include a pair of needle boards as a set. Each needle board has its corresponding supporting board. Two needle boards are provided on both the front and the rear sides of the raw sheet, and the raw sheet is held down from both sides by the supporting boards. The needles on the needle boards are arranged so that the positions of the needles on one needle board are not overlapped with the positions of the needles on the other needle board. Further, there are so many through holes provided in each of the supporting boards in consideration of the positions of needles on both needle boards so that no needle should contact the supporting boards when the needling process is performed on both surfaces of the raw sheet. With such a device, the raw sheet may be held down from both surfaces by using the two supporting boards and the needling process is performed on the raw sheet from both surfaces by using a pair of needle boards. When needles are thrust by such a method, the outer and center layers each having a high density of needle traces can be formed easily.

(Calcining Process)

Next, thus obtained raw sheet is heated from room temperature to approximately 1,250° C. and the temperature is maintained for approximately 0.5 to approximately 2 hours for continuous calcination to prepare the outer and center layers for the sheet member.

(Impregnating and Adding Binder Process)

When necessary, binder impregnating and adding process may be further performed to impregnate the outer and center layers with binder such as organic resin. By performing this process, a bulk height of the outer and center layers can be reduced and the separation of fibers from a completed sheet member can be further reduced. However, the binder impregnating and adding process is not always necessarily performed in this step. For example, the binder impregnating and adding process may be performed after the center layer is joined to the two outer layers (that is, after the sheet member is formed).

In the impregnating and adding process, the adding amount of the binder is preferably in the range between approximately 1.0 wt % and approximately 10.0 wt %. When it is more than approximately 1.0 wt %, the separation-prevention effect of inorganic fibers is not reduced. On the other hand, when it is less than approximately 10.0 wt %, the amount of organic component (decomposed gas of the binder) exhausted is not increased while the exhaust gas treatment apparatus is being operated.

As binder, organic binder such as epoxy resin, acrylate resin, rubber-based resin, and styrene-based resin may be used. Also, for example, acrylic rubber (ACM), acrylonitrile-butadiene rubber (NBR), and styrene-butadiene rubber (SBR) resin may be used.

The outer and center layers are impregnated with the binder by spray coating using the aqueous dispersion prepared by adding water to the binder. By this process, extra solid content and liquid added into the outer and center layers can be removed as described below.

The extra solid content is removed by a suction method using a suction device such as a vacuum pump. Also, the extra water may be removed by heating the sheet member at a temperature between approximately 90° C. and approximately 160° C. and/or by compressing the sheet member at a pressure between approximately 40 kPa and approximately 100 kPa.

Through such processes, the outer and center layers impregnated with the binder are formed.

(Joining Process of Outer and Center Layers)

Next, the outer layers are laminated onto the front and rear surfaces of the center layer to join the three layers. As described above, the methods of joining the three layers include a method using the "adhesive layer" and a method of sewing adjoining layers through the boundary surface. By such a method, the sheet member according to an embodiment of the present invention can be formed.

(Laminating Method 2)

In another example of the laminating method, a "papermaking method" is used to manufacture each layer. In the "papermaking method", each layer is formed through the processes of opening, slurrying, forming, and compressing and drying fibers.

(Opening Fibers)

First, an opening process of inorganic fibers is preformed. The opening process is performed through a dry-type opening process alone or through two processes consisting of the dry-type opening process and a wet-type opening process. In the dry-type opening process, a device such as a Feathermill may be used to open the raw fibers. On the other hand, in the wet-type opening process, the flocculated dry-type opened fibers obtained by the above-mentioned dry-type opening process are fed into a wet-type opening device to further perform the opening process. In the wet-type opening process, a wet-type opening device such as Pulper is used. Through such an opening process, the opened raw fibers can be obtained.

(Slurrying Process)

Next, thus obtained raw fibers are fed into a stirring device and are stirred for, for example, approximately 1 to approximately 5 minutes so that the relative weight of the raw fibers to water is in the range between approximately 1 wt % and approximately 2 wt % to prepare a mixture. Next, organic binder with approximately 4 wt % to approximately 8 wt % of the raw fibers is added to the mixture and the mixture is stirred for, for example, approximately 1 to approximately 5 minutes. Further, a flocculant with approximately 0.5 wt % of the raw fibers is added to the mixture and the mixture is stirred for up to 2 minutes to prepare raw slurry.

As inorganic binder, for example, alumina sol and/or silica gel are used. As organic binder, for example, a rubber-based material, a water-soluble organic polymer compound, thermoreversible resin, and thermohardening resin are used. As a flocculant, for example, Percol 292 (Ciba Specialty Chemicals) is used.

(Forming Process)

Next, the obtained raw slurry is fed into a forming device having a desired shape and is dehydrated. In a typical case, at the bottom of the forming device, there may be provided a filtering mesh (mesh size is, for example, 30 meshes) and, through the meshes, extra water in the raw slurry fed into the forming device is drained. Therefore, by using such a forming device, both forming the raw slurry in the desired shape and dehydrating the raw slurry can be performed at the same time. When necessary, extra water may be compulsorily sucked from the lower side of the forming device through the filtering meshes using, for example, a suction pump or a vacuum pump.

(Compressing and Drying Process)

Next, the thus obtained formed body is removed from the forming device and is compressed using a compression device so that the thickness becomes approximately 0.3 to approximately 0.5 times the thickness before this process, and is heated and dehydrated at a temperature between approximately 90° C. and approximately 150° C. for approximately 5 minutes to approximately 1 hour to obtain the outer layers.

The center layer can be formed by the same processes.

The binder impregnating and adding process may be performed as performed in the "laminating method 1" using the obtained outer layer However, as described above, in a case of the "laminating method", such binder impregnating and adding process may be performed after the three layers are joined.

Next, after three layers are laminated, by using the above-mentioned method (using a both-sided adhesive tape, an adhesive agent, or by sewing) the layers can be joined to manufacture the sheet member according to the embodiment of the present invention.

(All-In-One Forming Method 1)

In the "all-in-one forming method", the "needling processing method" and the "papermaking method" can also be used. In the "all-in-one forming method 1", an "all-in-one forming method" based on the "papermaking method" is described.

Figure 8:
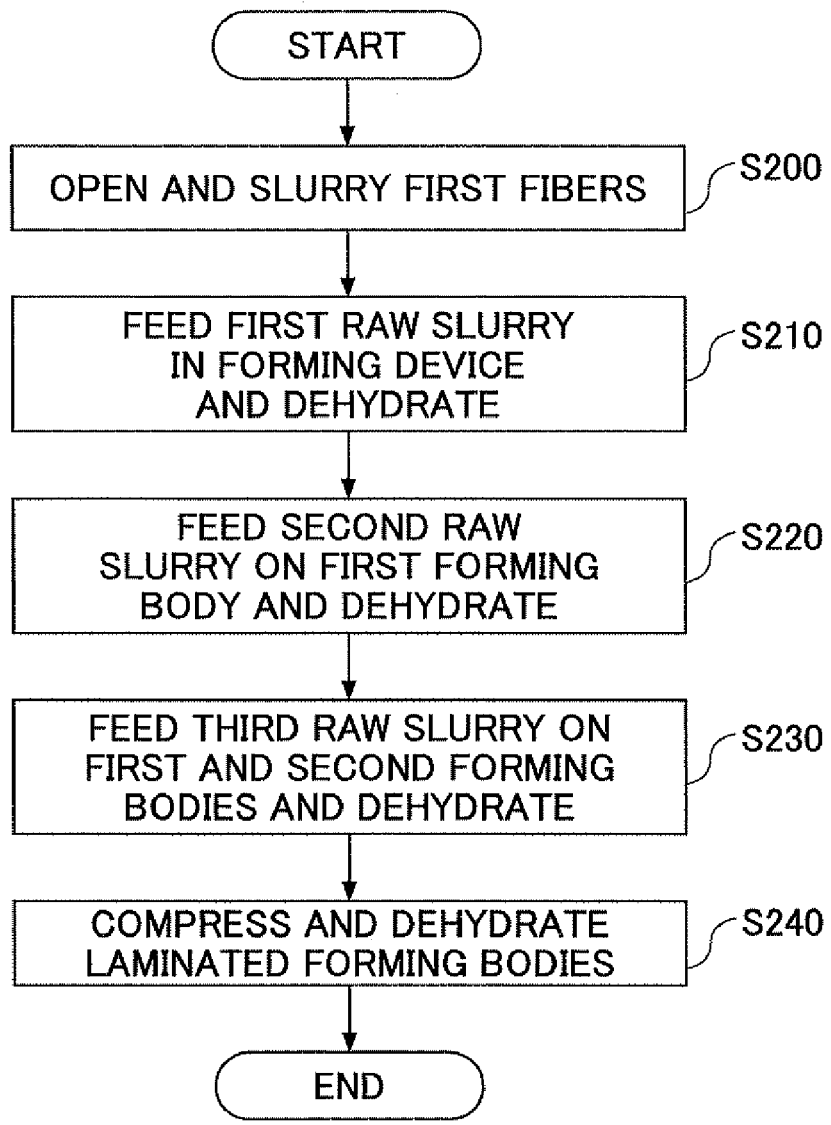
FIG. 8 is a flowchart showing a process of forming a sheet member based on an "all-in-one forming method 1" according to one embodiment of the present invention.

FIG. 8 is a flowchart showing a process of the all-in-one forming method 1 to form a sheet member according to the present invention. Through the series of processes in this method, a sheet member having a three-layer structure is formed using the "papermaking method".

In this method, a process of step S200, opening and slurrying processes, is the same as in the "laminating method 2". But the processes in and after step S210 in this method are different from the processes in the above-mentioned method.

More specifically, in step S210 of this method, first raw slurry is fed into a forming device and is dehydrated. Then, before the raw sheet is removed (that is in half-dehydrated condition), second raw slurry is added on the dehydrated forming body (hereinafter "first forming body") (step S220). Here, it should be noted that the inorganic fibers included in the first raw slurry do not include the "fine fibers", and the inorganic fibers included in the second raw slurry include the "fine fibers".

Next, the extra water included in the second raw slurry is drained from the lower side of the forming device through the first forming body and the filtering meshes to dehydrate the second raw slurry to prepare the second forming body. As described above, when necessary, the water may be compulsorily sucked from the lower side of the forming device.

Next, in step S230, before a "two-layered forming body" consisting of the first and the second forming bodies is removed (that is, in the half-dehydrated condition), third raw slurry is added on the "two-layered forming body". Further, the extra water included in the third raw slurry is drained from the lower side of the forming device through the "two-layered forming body" and the filtering meshes to dehydrate the third raw slurry. As described above, when necessary, the water may be compulsorily sucked from the lower side of the forming device. Here, it should be noted that the inorganic fibers included in the third raw slurry should not include the "fine fibers" and the third raw slurry may be the same as or different from the first raw slurry.

Through the above series of processes, a "laminated formed body" having a three-layer structure is obtained.

Next, in step S240, the "laminated formed body" is removed from the forming device and is compressed using, for example, a pressing device so that the thickness becomes approximately 0.3 to approximately 0.5 times the thickness before this step and is simultaneously heated and dehydrated at a temperature between, for example, approximately 90° C. and approximately 150° C. for approximately 5 minutes to approximately 1 hour. By this method, in a series of processes, a sheet member having a three-layer structure can be formed at one time. The above-mentioned binder impregnating and adding process may be further performed using the obtained sheet member.

In this method, the thus obtained sheet member has an advantage in that the bonding strength of the boundary surface is higher than that of the sheet member formed through a process of joining each of the layers using, for example, an adhesive agent. The reason for this is that the contacting area between the layers becomes larger since, in this method, before a layer is fully formed, the adjoining layer is laminated directly on the layer.

(All-In-One Forming Method 2)

The "all-in-one forming method 2" is the "all-in-one forming method" based on the "needling processing method".

In this method as well, generally, a sheet member is formed using the same processes as in the above-mentioned "laminating method 1". But, in this all-in-one forming method 2, in the process of preparing the spinning solution through blowing spinning, a precursor having a three-layer structure is laminated at one time to manufacture the raw sheet. Then, in the needling process, the needling process is performed on the raw sheet having the laminated three layers, thereby obtaining the raw sheet having a three-layer structure. It should be noted that, in the three-layered precursor, in the blowing spinning process, the center layer is formed so as to include the "fine fibers" and the outer layers are formed so as not to include the "fine fibers".

The processes after the above process in this method are the same as the processes in the "laminating method 1". But, obviously, a process of joining each of the layers is no longer necessary in this method.

In each of above-mentioned forming methods, cases where a sheet member having a three-layer structure are described. However, it is obvious that the present invention described herein is also applicable to any case where a sheet member has more than a three-layer structure as long as the upper- and lower-most layers of the sheet member do not include the "fine fibers". Such a sheet member having a multi-layered structure may be easily formed by, for example, laminating more than three layers in the "laminating method 1" and the "laminating method 2" or further adding fourth raw slurry to the top of the third raw slurry in the "all-in-one forming method 1".

In the above description, the forming method is described using the first sheet member. However, it is obvious for a person having an ordinary skill in the art that the described method is basically applicable to the second through the fourth sheet members as well.

EXAMPLE

The advantages of the embodiments of the present invention are described below with reference to the following embodiments.

To verify the advantages of the embodiment of the present invention, sheet members according to the embodiment of the present inventions are formed by the above-mentioned "laminating method" and various tests are performed. The sheet member is formed by the following processes.

Example 1

A first outer layer is formed by the "needling processing method". First, silica sol is added to basic aluminum chloride aqueous solution with aluminum content of 70 g/l and Al/Cl=1.8 (atom ratio) such that the relative proportion of $Al_2O_3:SiO_2$ in alumina-based fibers is 72:28 to prepare the precursor of alumina-based fibers. Next, polyvinyl alcohol is added to the precursor of alumina-based fibers. Further, this liquid is condensed to prepare a spinning solution. From the spinning solution, fibers are formed by the blowing spinning process. The flow rate of the carrier gas (air) is 52 m/s and the supplying rate of the spinning solution is 5.3 ml/h.

Then, the precursor of the alumina-based fibers is folded and laminated to manufacture a raw sheet of alumina-based fibers.

Next, the needling process is performed to the obtained raw sheet. In the needling process, a needling board having needles at a density of 80 needles per 100 $cm^2$ is provided on one side of the raw sheet and the needling is performed from the one side of the sheet member. Since the entire length of the needles is longer than the entire thickness of the sheet member, the needles can pass through the sheet member completely when the needling board presses and contacts from the one side.

Then, the obtained sheet member is heated from room temperature to 1,250° C. and the temperature is maintained for one hour for continuous calcination. Next, the obtained first outer layer is impregnated with binder. As the binder, acrylate-based Latex Emulsion is used and the impregnation amount is 5 wt % of the total weight.

By the same method, the second outer layer is obtained. The average diameter and the minimum diameters of the alumina-based fibers included in the first and the second outer layers are 7.2 micrometers and 3.2 micrometers, respectively. The thickness and the basis weight of each layer are 0.3 mm and 60 $g/m^2$, respectively.

By the same method, the center layer is formed. In the blowing spinning process in forming the center layer, the air flow rate is 63 m/s and the supplying rate of the spinning solution is 4.3 ml/h. The average diameter and the minimum diameters of the alumina-based fibers included in the center layer are 5.1 micrometers and 2.4 micrometers, respectively. The thickness and the basis weight of each layer are 6.8 mm and 1,080 $g/m^2$, respectively.

Next, the first outer layer, the center layer, and the second outer layer are joined by using a double-sided adhesive tape (thickness 100 micrometers provided by Beiersdor) in this order to manufacture a sheet member having a three-layer structure. The weight ratio of the first outer layer: the center layer: the second outer layer (wt %) is 5:90:5. This example is called example 1.

Example 2

By the same method as used in the example 1, a sheet member having a three-layer structure is formed. But in this example, the first and the second outer layers whose thicknesses and basis weights are 0.7 mm and 120 $g/m^2$ and the center layer whose thickness and basis weight are 6.0 mm and 960 $g/m^2$ are used. The weight ratio of the first outer layer: the center layer: the second outer layer (wt %) is 10:80:10. This example is called example 2.

Example 3

By the same method as used in the example 1, a sheet member having a three-layer structure is formed. But in this example, the first and the second outer layers whose thicknesses and basis weights are 0.9 mm and 180 $g/m^2$ and the center layer whose thickness and basis weight are 5.6 mm and 840 $g/m^2$ are used. The weight ratio of the first outer layer the center layer the second outer layer (wt %) is 15:70:15. This example is called example 3.

Example 4

By the same method as used in the example 1, a sheet member having a three-layer structure is formed. But in this examples the first and the second outer layers whose thicknesses and basis weights are 1.4 mm and 240 $g/m^2$ and the center layer whose thickness and basis weight are 4.6 mm and 720 $g/m^2$ are used. The weight ratio of the first outer layer the center layer:the second outer layer (wt %) is 20:60:20. This example is called example 4.

Example 5

By the same method as used in the example 1, a sheet member having a three-layer structure is formed. But in this example, the first and the second outer layers whose thicknesses and basis weights are 1.8 mm and 300 $g/m^2$ and the center layer whose thickness and basis weight are 3.8 mm and 600 $g/m^2$ are used. The weight ratio of the first outer layer:the center layer:the second outer layer (wt %) is 25:50:25. This example is called example 5.

Example 6

By the same method as used in the example 1, a sheet member having a three-layer structure is formed. But in this example, the first and the second outer layers whose thicknesses and basis weights are 2.2 mm and 360 $g/m^2$ and the center layer whose thickness and basis weight are 3.0 mm and 480 $g/m^2$ are used. The weight ratio of the first outer layer:the center layer:the second outer layer (wt %) is 30:40:30. This example is called example 6.

Example 7

By the same method as used in the example 1, a sheet member having a three-layer structure is formed. But in this example, the first and the second outer layers whose thicknesses and basis weights are 2.6 mm and 420 $g/m^2$ and the center layer whose thickness and basis weight are 2.2 mm and 360 $g/m^2$ are used. The weight ratio of the first outer layer:the center layer:the second outer layer (wt %) is 35:30:35. This example is called example 7.

Example 8

The first outer layer is formed by the "papermaking method".

First, an opening process of inorganic fibers is preformed. As the opening process, only the dry-type opening process using the Feathermill is performed. Next, the obtained raw fibers are fed into a stirring device and stirred for approximately 1 minute such that the relative weight of the raw fibers to water is between 1 wt % and 2 wt % to prepare a mixture. Next, approximately 5 wt % of organic binder is added to the mixture and the mixture is stirred for approximately 1 minute.

Further, approximately 0.5 wt % of inorganic binder is added to the mixture and the mixture is stirred for approximately 1 minute. Still further, approximately 0.5 wt % of a flocculant is added to the mixture and the mixture is stirred for up to approximately 2 minutes to prepare raw slurry.

As inorganic binder, alumina sol is used. As organic binder, the acrylate-based Latex is used. As a flocculant, the Percol 292 is used.

Next, the obtained raw slurry is fed into a forming device with the sizes of 800 mm×500 mm (mesh size is 30 meshes) for further dehydration.

Next, the thus obtained formed body is removed from the forming device and is compressed using a pressing device so that the thickness becomes substantially 0.5 times the thickness before this compression and is simultaneously heated and dehydrated at a temperature of 150° C. for 5 minutes to obtain the first outer layer.

The second outer layer is also formed in the same method of forming the first outer layer. The average diameter and the minimum diameters of the alumina-based fibers included in the first and the second outer layers are 7.2 micrometers and 3.2 micrometers, respectively. The thickness and the basis weight of each layer are 0.8 mm and 120 g/m², respectively.

Further, the center layer is also formed by the same method. In the opening process when the center layer is formed, the dry-type opening using the Fethermill is performed. The average diameter and the minimum diameters of the alumina-based fibers included in the center layer are 5.1 micrometers and 2.4 micrometers, respectively. The thickness and the basis weight of the layer are 6.4 mm and 960 g/m, respectively.

Next, the first outer layer, the center layer, and the second outer layer are joined by using a double-sided adhesive tape (thickness 100 micrometers provided by Beiersdor) in this order to manufacture a sheet member having a three-layer structure. The weight ratio of the first outer layer:the center layer:the second outer layer (wt %) is 10:80:10. This example is called example 8.

Comparative Example 1

The center layer is formed by the same method as in example 1. The basis weight and the thickness of the center layer are 1,200 g/m² and 7.4 mm, respectively. But in this comparative example, no outer layers are formed; therefore there is provided only a single layer of the center layer. This comparative example is called comparative example 1.

Comparative Example 2

The first and the second outer layers are formed by the same method in example 1. The basis weight and the thickness of the first and the second outer layers are 600 g/m² and 3.7 mm, respectively. In this comparative example, no center layer is formed, and the first outer layer and the second outer layer are joined together using a both-sided adhesive tape (thickness 100 micrometers provided by Beiersdor) to manufacture the sheet member. The weight ratio of the first outer layer:the second outer layer (wt %) is 50:50. This comparative example is called comparative example 2.

Table 1 shows the basis weight, the thickness, and the weight ratio of the both outer layers and center layer, and the comparative thickness of the first and second outer layers to the thickness of the sheet member in examples 1 through 8 and comparative examples 1 and 2.

TABLE 1

| | FORMING METHOD OF SHEET MEMBER | FIRST OUTER LAYER (AVERAGE FIBER DIAMETER 7.2 µm) (MINIMUM FIBER DIAMETER 3.2 µm) | | | CENTER LAYER (AVERAGE FIBER DIAMETER 5.1 µm) (MINIMUM FIBER DIAMETER 2.4 µm) | | | SECOND OUTER LAYER (AVERAGE FIBER DIAMETER 7.2 µm) (MINIMUM FIBER DIAMETER 3.2 µm) | | |
|---|---|---|---|---|---|---|---|---|---|---|
| | | BASIS WEIGHT (g/m²) | THICK-NESS (mm) | WEIGHT RATIO (wt %) | BASIS WEIGHT (g/m²) | THICK-NESS (mm) | WEIGHT RATIO (wt %) | BASIS WEIGHT (g/m²) | THICK-NESS (mm) | WEIGHT RATIO (wt %) |
| EXAMPLE 1 | NEEDLING PROCESSING METHOD | 60 | 0.3 | 5 | 1080 | 6.8 | 90 | 60 | 0.3 | 5 |
| EXAMPLE 2 | NEEDLING PROCESSING METHOD | 120 | 0.7 | 10 | 960 | 6.0 | 80 | 120 | 0.7 | 10 |
| EXAMPLE 3 | NEEDLING PROCESSING METHOD | 180 | 0.9 | 15 | 840 | 5.6 | 70 | 180 | 0.9 | 15 |
| EXAMPLE 4 | NEEDLING PROCESSING METHOD | 240 | 1.4 | 20 | 720 | 4.6 | 60 | 240 | 1.4 | 20 |
| EXAMPLE 5 | NEEDLING PROCESSING METHOD | 300 | 1.8 | 25 | 600 | 3.8 | 50 | 300 | 1.8 | 25 |
| EXAMPLE 6 | NEEDLING PROCESSING METHOD | 360 | 2.2 | 30 | 480 | 3.0 | 40 | 360 | 2.2 | 30 |
| EXAMPLE 7 | NEEDLING PROCESSING METHOD | 420 | 2.6 | 35 | 360 | 2.2 | 30 | 420 | 2.6 | 35 |
| EXAMPLE 8 | PAPERMAKING METHOD | 120 | 0.8 | 10 | 960 | 6.4 | 80 | 120 | 0.8 | 10 |
| COMPARATIVE EXAMPLE 1 | NEEDLING PROCESSING METHOD | — | — | 0 | 1200 | 7.4 | 100 | — | — | 0 |

TABLE 1-continued

| | | | | | | | | | | |
|---|---|---|---|---|---|---|---|---|---|---|
| COMPARATIVE EXAMPLE 2 | NEEDLING PROCESSING METHOD | 600 | 3.7 | 50 | — | — | 0 | 600 | 3.7 | 50 |

| | THICKNESS RATIO OF FIRST AND SECOND LAYERS TO THICKNESS OF ENTIRE SHEET MEMBER (%) | RESTORATION PRESSURE AFTER 1000 TEST CYCLES (kPa) | RESTORATION PRESSURE REDUCTION RATE AFTER 1000 TEST CYCLE (%) | RESULT OF FIBER AIR EROSION TEST MIX RATE OF FIBERS HAVING DIAMETER LESS THAN 3 μm(%) |
|---|---|---|---|---|
| EXAMPLE 1 | 8.1 | 92.9 | 51.3 | 0.3 |
| EXAMPLE 2 | 18.9 | 87.0 | 53.6 | 0.3 |
| EXAMPLE 3 | 24.3 | 75.1 | 57.8 | 0.3 |
| EXAMPLE 4 | 37.8 | 69.4 | 60.6 | 0.3 |
| EXAMPLE 5 | 48.6 | 63.2 | 62.6 | 0.3 |
| EXAMPLE 6 | 59.5 | 59.1 | 64.7 | 0.3 |
| EXAMPLE 7 | 70.3 | 55.9 | 66.3 | 0 |
| EXAMPLE 8 | 20.0 | 61.3 | 52.4 | 0.3 |
| COMPARATIVE EXAMPLE 1 | — | 96.2 | 50.4 | 1.2 |
| COMPARATIVE EXAMPLE 2 | 100 | 47.4 | 68.8 | 0 |

(Fiber Air Erosion Test)

A fiber air erosion test is performed on each of the obtained sheet members. The result of this test provides the prediction of the scattering status of the "fine fibers" when each of the sheet members are being actually handled.

Figure 9:
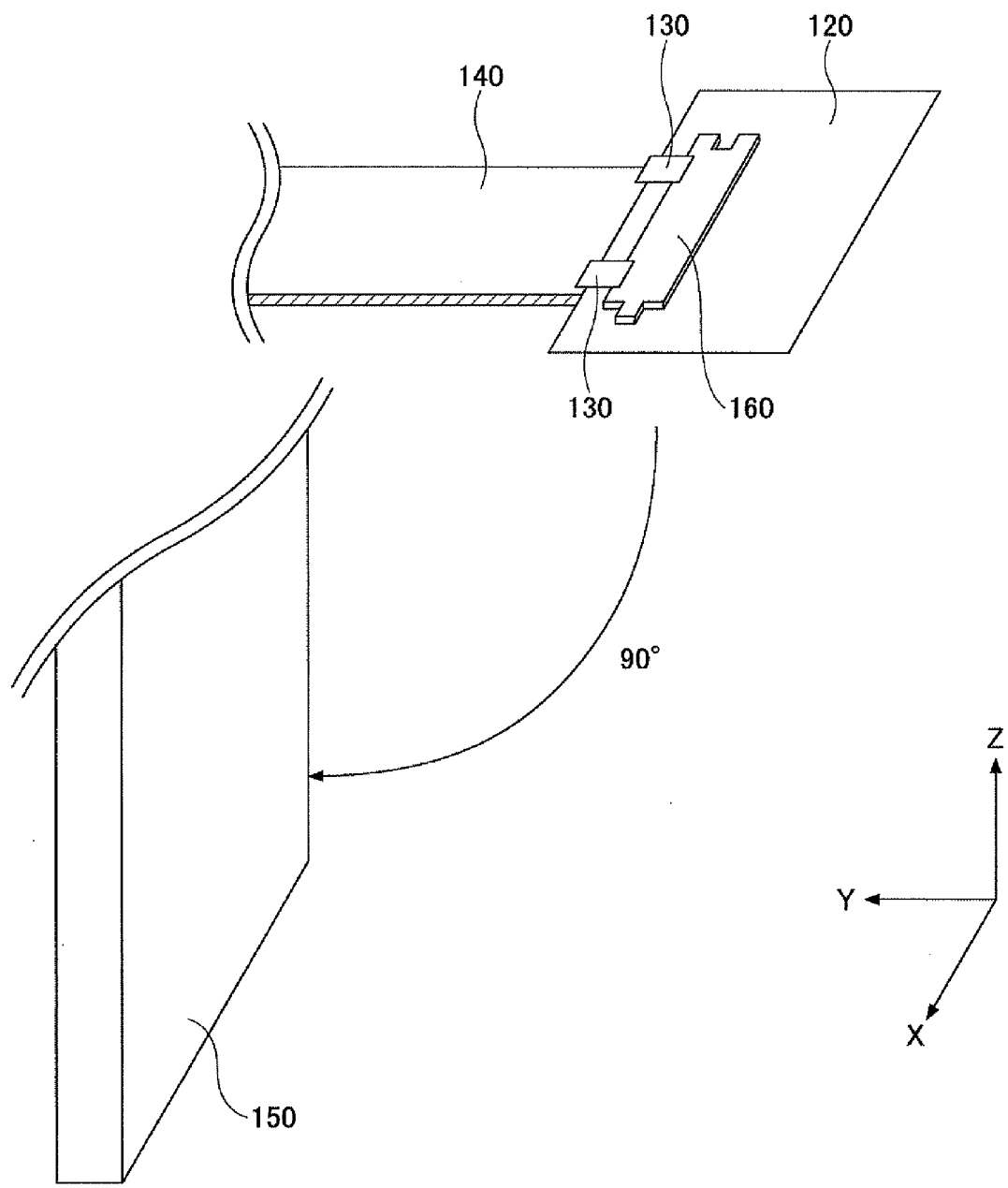
FIG. 9 is a drawing showing a part of a fiber air erosion testing device.

FIG. 9 shows a part of a fiber air erosion testing device. The fiber air erosion test is performed as follows. First, each of the above sheet members is cut into the figure shown in FIG. 1 (max length 262 mm in the X direction x max length 83.5 mm in the Y direction) and the obtained each sheet member is used as the test sample 160. The test sample 160 is contained in a vinyl bag 120 larger than the test sample 160. The test sample 160 is fixed to its position close to one side of the vinyl bag 120 using clips 130 as shown in FIG. 9. The vinyl bag 120 is filled with an appropriate amount of air and is sealed. Next, the vinyl bag 120 is fixed to one side of an arm 140, (with the entire length of 80 cm) extended from a test device 110, using the above or the other clips. The other side of the arm 140 is connected to a vertical wall 150 of the test device 110. The vertical wall 150 is made of metal, and its principal plane is positioned parallel to the XZ plane of FIG. 9. The thickness (in the Y direction) of the vertical wall 150 is 25 mm. The arm 140 is capable of rotating within a plane (YZ plane) vertical to the principal plane of the vertical wall 150 around a fulcrum where the arm 140 is connected to the vertical wall 150. The arm 140 can rotate at least 90 degrees from a position where the arm is substantially parallel with the principal plane. However, before this test is started, the arm 140 is fixed at substantially 90 degrees with respect to the vertical direction (that is fixed substantially horizontally) using a catch (not shown). From this position, when the catch is released, the arm 140 rotates substantially 90 degrees along the arrow (shown in FIG. 9) direction in the YZ plane, and accordingly the vinyl bag 120 rotates along the arrow and collides with the vertical wall 150. The impact of the collision brings the scattering of the inorganic fibers from the test sample 160 of the sheet member. However, the scattered inorganic fibers are trapped insides the vinyl bag 120. Then the vinyl bag is gently opened, and the scattered fibers sticking to the vinyl bag 120 are collected using an adhesion tape (1 cm×1 cm). Next, a scanning electron telescope is used to take pictures with 1,500 times magnification at appropriate positions on the adhesive tape and the diameters of the inorganic fibers are measured. The measurement is performed by measuring approximately 300 fibers and a scattering rate of the "fine fibers" is obtained using the following equation:

Scattering rate of "fine fibers"=$(A/B)*100$ where

A: the number of inorganic fibers having a diameter of 3 micrometers or less

B: the number of measured inorganic fibers

The results of each sheet member are shown in Table 1. The results in Table 1 show that the scattering rate in comparative example 1 is 1.2%; on the other hand, the scattering rates of the sheet member in examples 1 through 8 are 0.3% or less. As a result, the scattering rate of the sheet members having a three-layer structure according to the embodiments of the present invention can be remarkably reduced.

(Compression and Restoration Repeated Test)

A compression and restoration repeated test is performed on each of the obtained sheet members. In this test, each sheet member is compressed and then restored to repeat this cycle up to 1,000 times and the change of the surface pressure of the sheet member is measured. From the result of this test, the downward trend of the holding power of each of the sheet members can be comparatively evaluated.

Figure 10:
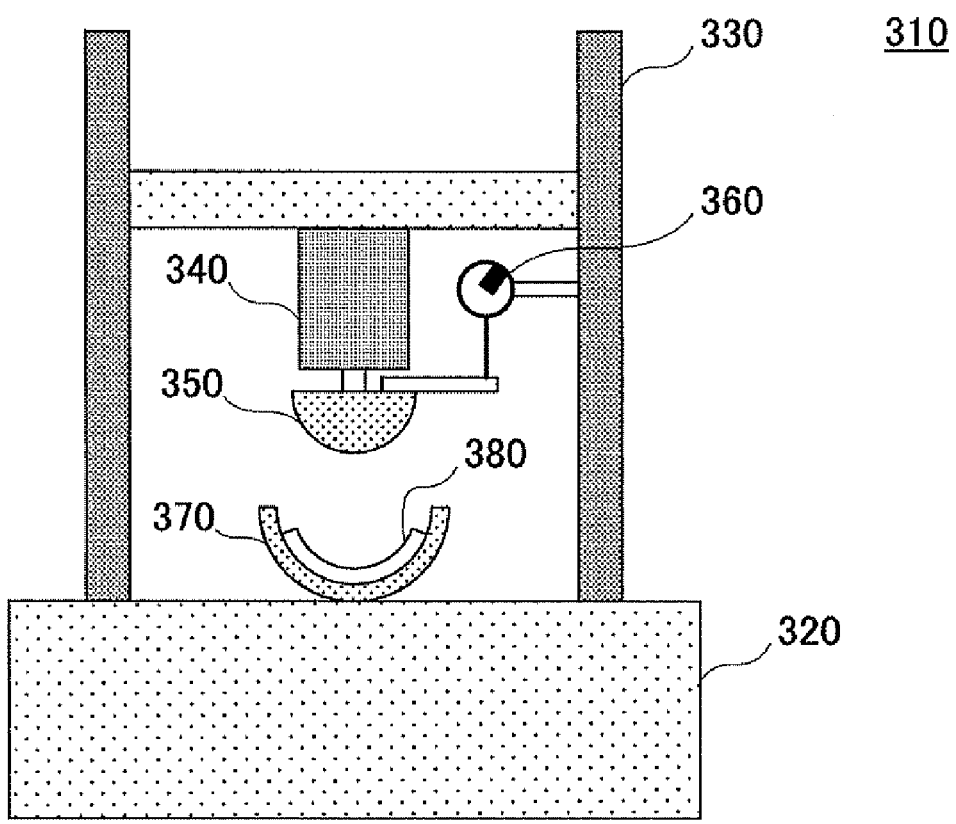
FIG. 10 is a schematic diagram showing a compression and restoration repeated test device.

FIG. 10 shows a device 310 used in this compression and restoration repeated test. The device 310 includes a sample holding plate 320 provided substantially horizontally and a pair of supporting posts 330 provided on the holding plate 320. At the center of the device 310 (above the sample holding place 320), there is a crosshead 340 having a weight-measuring function, provided so as to move up and down. On the lower surface side of the crosshead 340, there is provided an upper pressing member 350 made of stainless steel, formed in a half-cylinder shape having a diameter of approximately 103 mm. The upper pressing member 350 is equipped with a displacement meter 360. On the sample holding plate 320 there is provided a lower tray member 370, made of stainless steel and formed in a half-cylinder shape having a diameter of approximately 111 mm. The inside part of the half-cylinder of the lower tray member 370 is hollowed out so that the inside part faces and fits the outer shape of the upper pressing member 350. When the test is being performed, each sample 380 of the sheet members having a known weight (with sizes of 50 cm×50 cm) is placed on the inner surface of the lower tray member 370.

By the following method using such a device 310, measurements are performed. First, the position of the crosshead 340 is previously lowered to the level where there should be no significant gap capable of being easily recognized between the sample 380 and the upper pressing member 350. In this position, the crosshead 340 is moved downward at a speed of 1 mm/min to compress the sample 380. When the bulk density of the sample reaches 0.4 g/cm³, the load applied to the sample 380 is measured. The bulk density of the sample 380 is calculated by the following equation:

Bulk density=(C/D)/E.

where
C: weight of sample 380
D: area of sample 380
E: distance between upper pressing member 350 and lower tray member 370 The obtained load is divided by the area of the sample to obtain the compression pressure (kPa).

Next, the crosshead 340 is moved upward at a speed of 1 mm/min to restore the sample 380. When the bulk density of the sample reaches 0.367 g/cm³, the load applied to the sample 380 is measured. The obtained load is divided by the area of the sample to obtain a restoration pressure (kPa). This test cycle (compress and restore) is repeated 1,000 times to measure the changes of the values of the compression pressure and the restoration pressure. The same measurement is repeated three times for each of the samples to obtain the average values. The averaged values are used as the result of the test.

Figure 11:
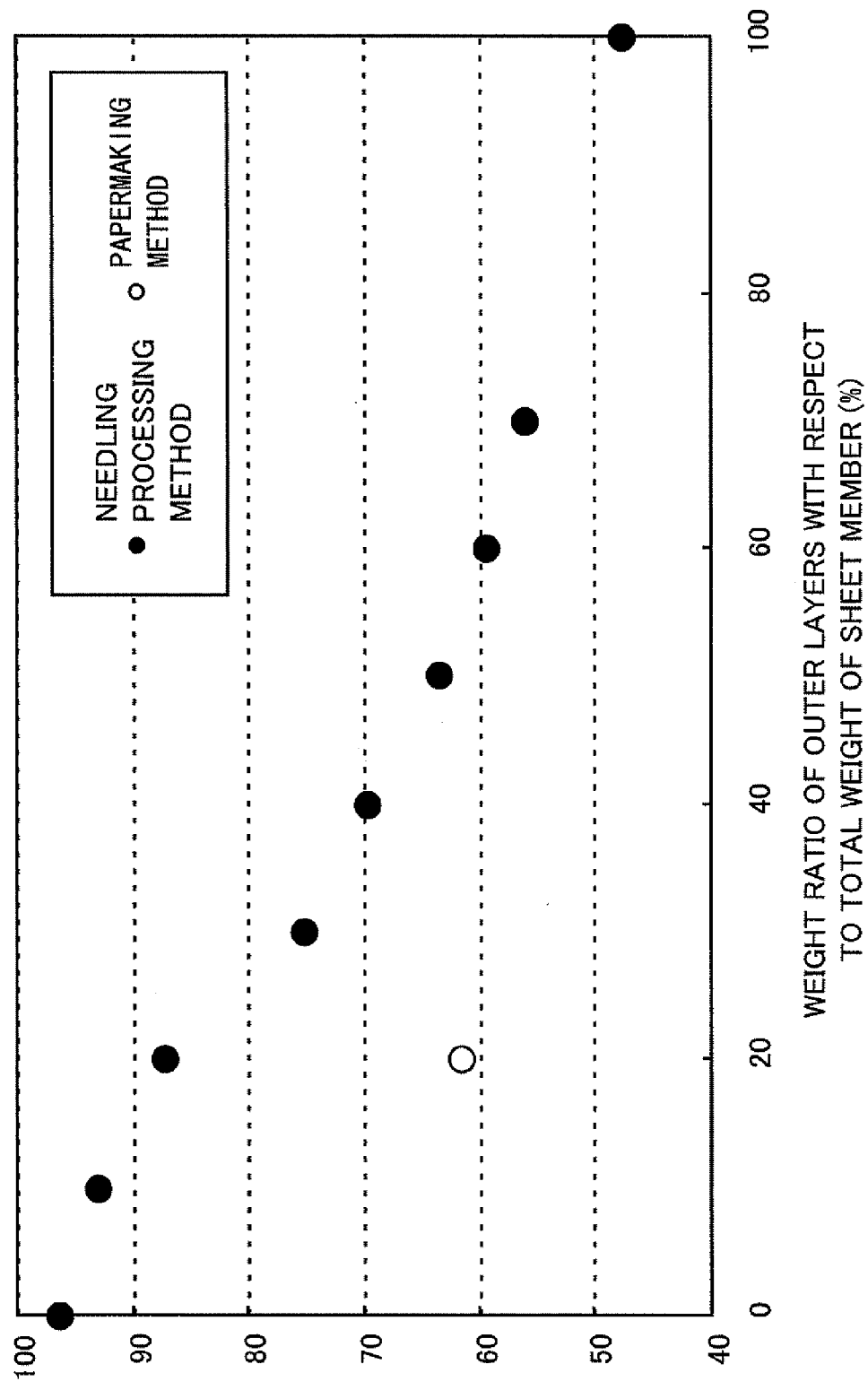
FIG. 11 is a graph showing a relationship between a weight ratio of outer layers with respect to the total weight of the sheet member and the restoration pressure after 1,000 test cycles.
Figure 12:
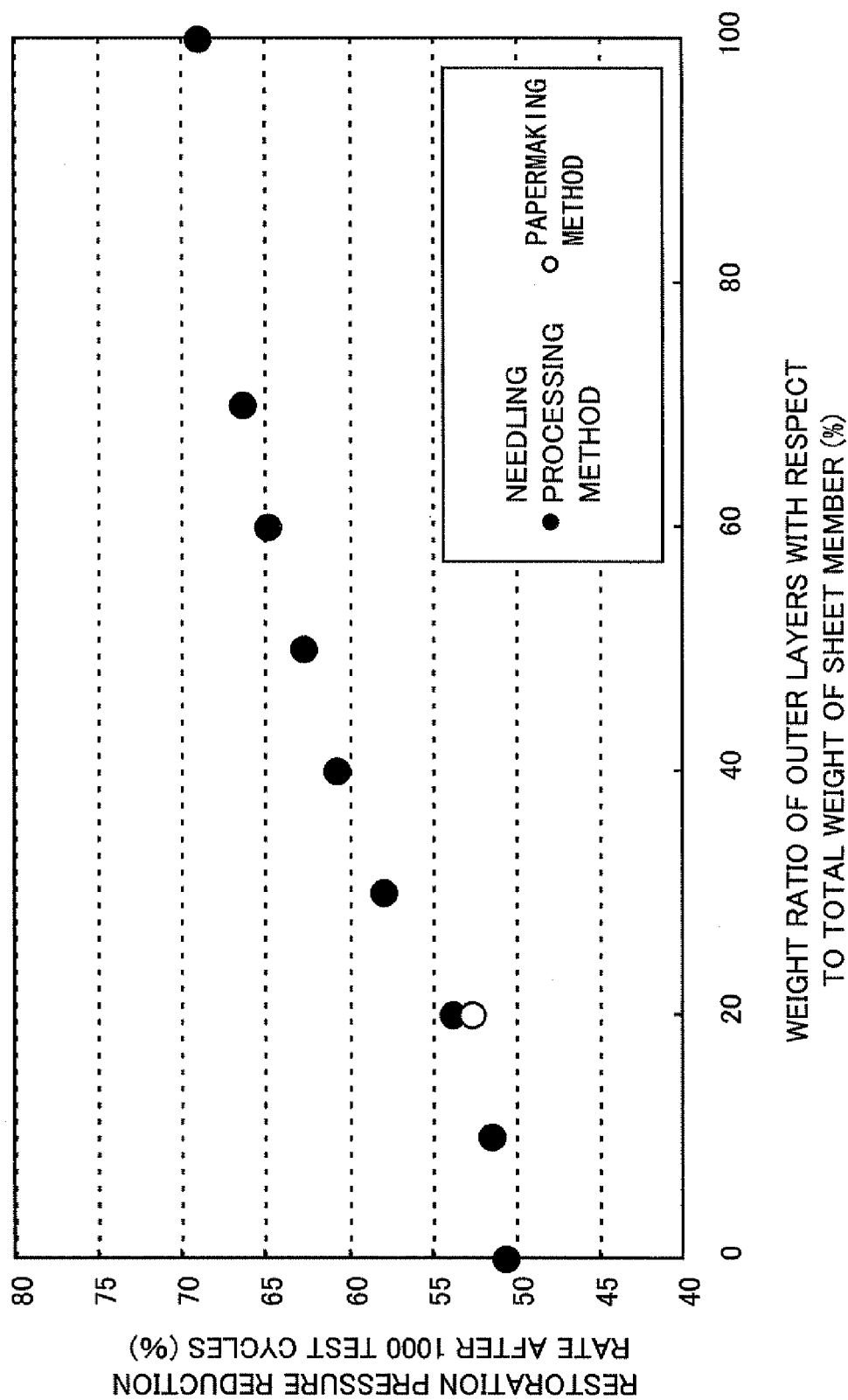
FIG. 12 is a graph showing a relationship between the weight ratio of outer layers with respect to the total weight of the sheet member and the pressure reduction rate after 1,000 test cycles.
Figure 13:
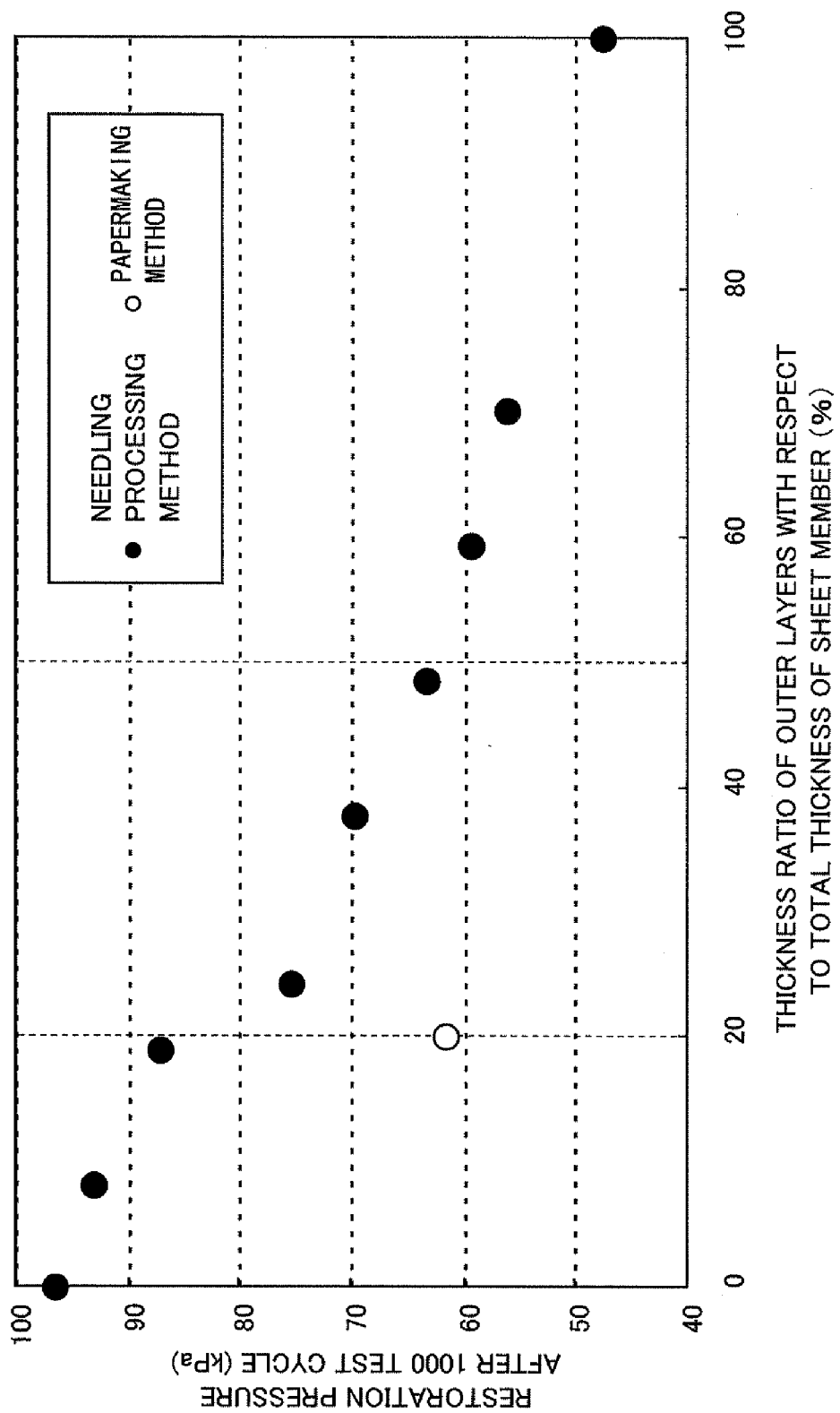
FIG. 13 is a graph showing a relationship between a thickness ratio of outer layers with respect to the total thickness of the sheet member and the restoration pressure after 1,000 test cycles.
Figure 14:
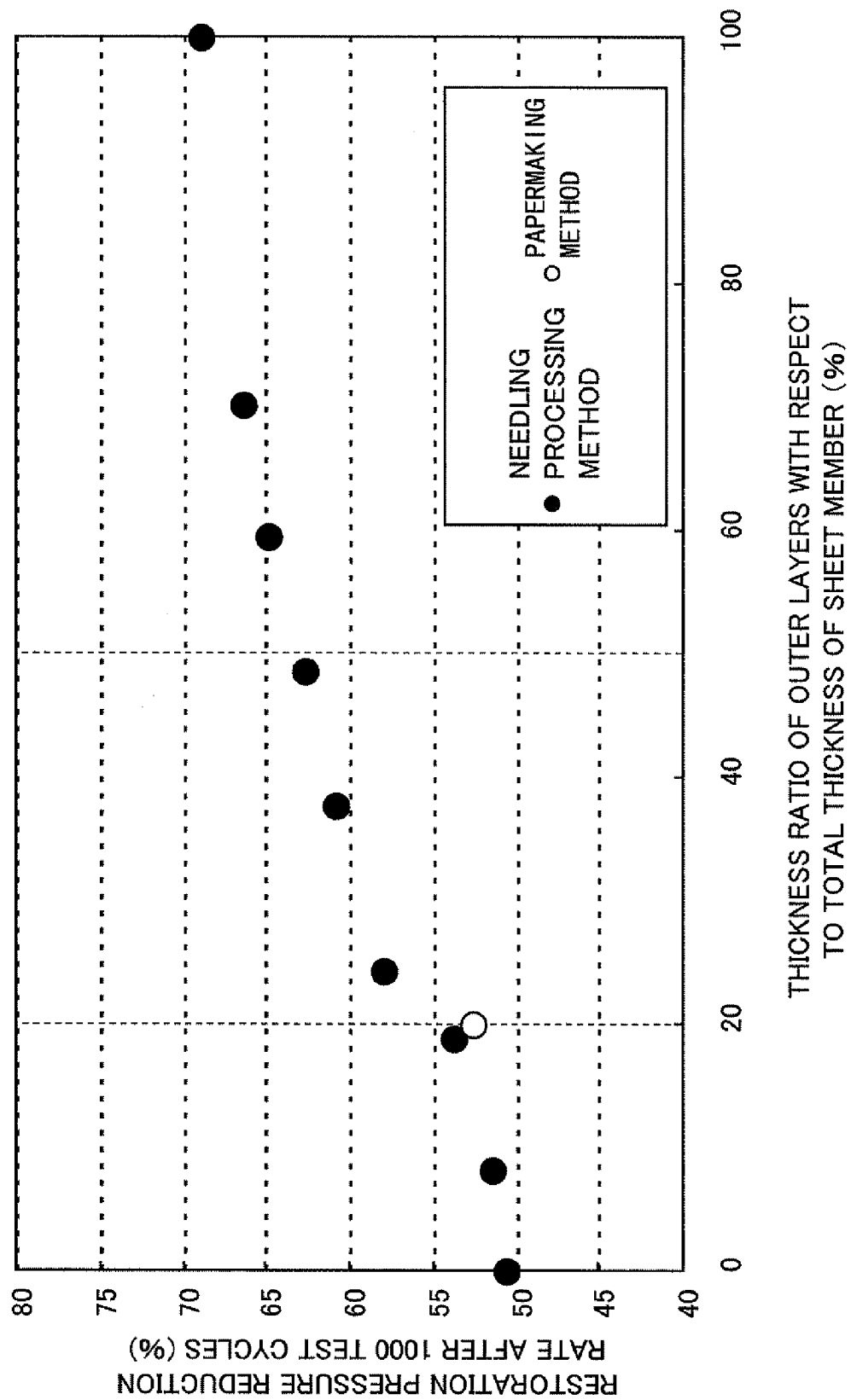
FIG. 14 is a graph showing a relationship between a thickness ratio of outer layers with respect to the total thickness of the sheet member and the pressure reduction rate after 1,000 test cycles.

The obtained results of each of the samples are shown in FIGS. 11 through 14, and Table 1. In FIGS. 11 and 12, the horizontal axis represents the weight ratio (wt %) of the outer layer(s) with respect to the weight of the sheet member. The vertical axes in FIG. 11 and FIG. 12 represent the restoration pressure (kPa) and a pressure reduction rate (%), respectively, after 1,000 times repetition of the test cycle. The pressure reduction rate is calculated by the following equation:

Pressure reduction rate=F/G where
F: (restoration pressure after one test cycle
restoration pressure after 1,000 times repetition of test cycle)
G: restoration pressure after one test cycle
Further, in FIGS. 13 and 14, the horizontal axis represents a thickness ratio (%) of the outer layers with respect to the total thickness The vertical axes in FIG. 13 and FIG. 14 represent the restoration pressure (kPa) and a pressure reduction rate (%), respectively, after 1,000 repetitions of the test cycle.

A result of the test shows that the restoration pressure of the sheet member in comparative example 2 is reduced by as much as 68.8%. In contrast, the restoration pressure of the sheet members after 1,000 repetitions of the test cycle in examples 1 through 8 according to the embodiment of the present invention are maintained at higher levels and the maximum pressure reducing rate among them is 66.3%.

Specifically, the values of the pressure reduction rate of the sheet members in examples 1 through 5 and 8 (weight ratio of the outer layers: 10-50 wt %, thickness ratio of the outer layers: 8-50%) after 1,000 repetitions of the test cycle are less than 62.6%, thereby showing sufficient reduction attenuation effect of the pressure. More specifically, the values of the pressure reduction rate of the sheet members in examples 1, 2, and 8 (weight ratio of the outer layers: 10-20 wt %, thickness ratio of the outer layers: 8-22%) are in the range between 51.3% and 53.6%, which are low reducing rates since the obtained rate values are comparable with 50.4% which is the rate value of a conventional sheet member (obtained in comparative example 1).

According to the result in FIG. 12, when the weight ratio (W) of the amount of the first and the second outer layers with respect to the total weight of the entire sheet is in a range greater than 50 wt %, the pressure reduction rate is apt to asymptotically approach the maximum value (68.8% in comparative example 2). Further, when the weight ratio (W) is in a range equal to or less than 20 wt %, the pressure reduction rate is apt to asymptotically approach the minimum value (50.4% in comparative example 1).

Similarly, according to the result in FIG. 14, when the thickness ratio (t) of the amount of the first and the second outer layers with respect to the total thickness of the entire sheet is in a range greater than 50%, the pressure reduction rate is apt to asymptotically approach the maximum value (68.8% in comparative example 2). Further, when the thickness ratio (t) is in a range equal to or less than 20%, the pressure reduction rate is apt to asymptotically approach the minimum value (50.4% in comparative example 1).

According to the above results, the weight ratio (W) of the amount of the first and the second outer layers with respect to the total weight of the entire sheet is preferably in a range of greater than 0 wt % to equal to or less than 50 wt %, and more preferably in a range of greater than 0 wt % to equal to or less than 20 wt %. Further, the thickness ratio (t) of the amount of the first and the second outer layers with respect to the total thickness of the entire sheet is preferably in a range greater than 0% to equal to or less than 50%, and more preferably in a range of greater than 0% to equal to or less than 20%. However, as described above, practically, it is conceived that the weight ratio of the outer layers (W) is equal to or greater than 2 wt % and the thickness ratio of the outer layers (t) is equal to or greater than 1%.

The sheet member according to the embodiments of the present invention is applicable to, for example, an exhaust gas treatment apparatus, a holding and sealing member, and a heat insulating member for a vehicle, and a sound absorber of a muffling apparatus.

Obviously, numerous modifications and variations of the present invention are possible in light of the above teachings. It is therefore to be understood that within the scope of the appended claims, the invention may be practiced otherwise than as specifically described herein.

What is claimed is:

1. A sheet member for an exhaust gas treatment apparatus including inorganic fibers, the sheet member comprising:
   first and second outer layers; and
   a center layer; wherein
   the first outer layer, the center layer, and the second outer layer are laminated with each other such that both the first and the second outer layers are outermost layers;
   the center layer includes needle traces, and inorganic fibers having a diameter less than 3 micrometers;
   the first and the second outer layers include inorganic fibers having a diameter greater than approximately 3 micrometers; and
   the sheet member further includes a covering layer provided so as to cover at least a side face of the center layer, said side face facing an inlet of the exhaust gas treatment apparatus, said covering layer directly contacting the side face of the center laver and being arranged to be perpendicular to the center layer,
   wherein the sheet member is provided around at least a part of the exhaust gas treatment apparatus.

2. The sheet member according to claim 1, wherein the first and the second outer layers include inorganic fibers whose value "A", calculated by the following formula (1), of the inorganic fibers included in the first and the second outer layers is greater than approximately 6 micrometers:

$$A=(M-2*e) \qquad (1)$$

wherein, a reference symbol "M" represents an average diameter of the inorganic fibers included in the outer layers, and a reference symbol "e" represents a standard error given by the following formula $$e = (\sigma \div \sqrt{n}) \quad (2)$$

wherein, reference symbols "σ" and "n" represent a standard deviation and a number of measurements, respectively.

3. The sheet member according to claim 1, wherein one of the first outer layer and the second outer layer or both of the outer layers include bio-soluble inorganic fibers.

4. The sheet member according to claim 1, wherein an average diameter and a minimum diameter of the inorganic fibers included in the first outer layer are substantially equal to an average diameter and a minimum diameter, respectively, of the inorganic fibers included in the second outer layer.

5. The sheet member according to claim 1, wherein the first and the second outer layers are substantially same.

6. The sheet member according to claim 1, wherein a weight ratio (W) of a total weight of the first and the second outer layers with respect to a total weight of an entire sheet member is in a range greater than approximately 0 wt % and equal to or less than approximately 50 wt %.

7. The sheet member according to claim 1, wherein the covering layer further covers side faces of the first and second outer layers.

8. The sheet member according to claim 7, wherein the covering layer is substantially same as the first outer layer or the second outer layer.

9. The sheet member according to claim 1, further comprising: binder.

10. The sheet member according to claim 1, further comprising:
an adhesive layer disposed between the first or the second outer layer and the center layer.

11. A method of forming a sheet member for an exhaust gas treatment apparatus including inorganic fibers, the method comprising:
a step of forming a first outer layer including inorganic fibers having a minimum diameter greater than approximately 3 micrometers;
a step of forming a center layer including needle traces, and inorganic fibers having a diameter less than 3 micrometers;
a step of forming a second outer layer including inorganic fibers having a minimum diameter greater than approximately 3 micrometers;
a step of laminating and joining the first outer layer, the center layer, and the second outer layer such that both the first and the second outer layers are outermost layers; and
a step of forming a covering layer provided so as to cover at least a side face of the center layer, said side faces facing inlet and outlet of the exhaust gas treatment apparatus, said covering layer directly contacting the side face of the center layer and being arranged to be perpendicular to the center layer,
wherein the sheet member is provided around at least a part of the exhaust gas treatment apparatus.

12. A method of forming a sheet member according to claim 11, wherein
the first and the second outer layers include inorganic fibers whose value "A", calculated by the following formula (1), of the inorganic fibers included in the first and the second outer layers is greater than approximately 6 micrometers:

$$A = (M - 2*e) \quad (1)$$

wherein, a reference symbol "M" represents an average diameter of the inorganic fibers included in the outer layers, and a reference symbol "e" represents a standard error given by the following formula $$e = (\sigma \div \sqrt{n}) \quad (2)$$

wherein, reference symbols "σ" and "n" represent a standard deviation and a number of measurements, respectively.

13. The method of forming a sheet member according to claim 11, wherein
one of the first outer layer and the second outer layer or both of the outer layers include bio-soluble inorganic fibers.

14. The method of forming a sheet member according to claim 11, wherein,
in the step of laminating and joining the layers, the formed layers are joined to each other with an adhesive layer.

15. The method of forming a sheet member according to claim 11, further comprising:
a step of impregnating the sheet member with binder.

16. The sheet member according to claim 1, wherein
a thickness ratio (t) of a total thickness of the first and the second outer layers with respect to a total thickness of the entire sheet member is in a range greater than approximately 0% and equal to or less than approximately 50%.

17. The method of forming a sheet member according to claim 11, wherein
a weight ratio (W) of a total weight of the first and the second outer layers with respect to a total weight of an entire sheet member is in a range greater than approximately 0 wt% and equal to or less than approximately 50 wt%.

18. The method of forming a sheet member according to claim 11, wherein
a thickness ratio (t) of a total thickness of the first and the second outer layers with respect to a total thickness of the entire sheet member is in a range greater than approximately 0 % and equal to or less than approximately 50 %.

19. The sheet member according to claim 1, wherein the covering layer is attached to the side face of the center layer by an adhesive.

20. The sheet member according to claim 1, wherein the covering layer is attached to the side face of the center layer by stitching.

21. The sheet member according to claim 7, further comprising attaching the covering layer to the side face of the center layer by an adhesive.

22. The sheet member according to claim 7, further comprising attaching the covering layer to the side face of the center layer by stitching.

* * * * *